(12) United States Patent
Sobel et al.

(10) Patent No.: US 11,746,522 B2
(45) Date of Patent: Sep. 5, 2023

(54) SNAP CONNECTORS FOR WALL FRAMING

(71) Applicant: HYPERFRAME INC., Richmond, CA (US)

(72) Inventors: Kenneth Sobel, Richmond, CA (US); David Taylor, Berkeley, CA (US)

(73) Assignee: Hyperframe Inc., Richmond, CA (US)

( * ) Notice: Subject to any disclaimer, the term of this patent is extended or adjusted under 35 U.S.C. 154(b) by 183 days.

(21) Appl. No.: 17/507,768

(22) Filed: Oct. 21, 2021

(65) Prior Publication Data

US 2022/0120078 A1 Apr. 21, 2022

Related U.S. Application Data

(60) Provisional application No. 63/094,868, filed on Oct. 21, 2020.

(51) Int. Cl.
*E04B 1/58* (2006.01)
*E04B 1/41* (2006.01)
*E04B 2/58* (2006.01)
*E04B 1/38* (2006.01)

(52) U.S. Cl.
CPC .............. *E04B 1/5818* (2013.01); *E04B 1/40* (2013.01); *E04B 2/58* (2013.01); *E04B 2001/405* (2013.01)

(58) Field of Classification Search
CPC . E04B 1/5818; E04B 1/40; E04B 2/58; E04B 2001/405; E04B 2/789; E04B 2001/2409; E04B 2001/2436; E04B 2001/2448; E04B 2/82
See application file for complete search history.

(56) References Cited

U.S. PATENT DOCUMENTS

| 4,068,440 | A | * | 1/1978 | Lillethorup | E04B 1/5818 52/301 |
| 5,218,803 | A | | 6/1993 | Wright | |
| 5,325,651 | A | * | 7/1994 | Meyer | E04C 3/32 52/696 |
| 8,250,822 | B2 | * | 8/2012 | O'Connor | F16B 2/248 24/546 |
| 9,127,456 | B2 | * | 9/2015 | Dollerup | E04C 3/00 |
| 10,665,988 | B2 | * | 5/2020 | Sobel | E04B 2/768 |
| 10,894,516 | B2 | * | 1/2021 | Benedetti | F16B 5/0657 |
| 10,985,498 | B2 | * | 4/2021 | Sobel | H01R 13/426 |

(Continued)

OTHER PUBLICATIONS

International Search Report and Written Opinion, 10 pages, issued by the International Searching Authority dated Feb. 8, 2022, for corresponding International Application No. PCT/US2021/056120.

*Primary Examiner* — Rodney Mintz
(74) *Attorney, Agent, or Firm* — Polsinelli PC

(57) ABSTRACT

A framing system includes a first connection assembly that engages with a substrate. The first connection assembly includes a first connector and a track. At least one spring flange defined by the first connector engages with a fastener positioned along the substrate to maintain the first connection assembly in a fixed position relative to the substrate and to interconnect the substrate with the track. The framing system further includes a second connection assembly defining a second connector engaged to a stud. The second connection assembly engages with the first connection assembly to interconnect the stud with the track.

17 Claims, 20 Drawing Sheets

(56) References Cited

U.S. PATENT DOCUMENTS

| | | | |
|---|---|---|---|
| 2002/0020140 A1* | 2/2002 | Sucre F. | E04C 3/07 |
| | | | 52/582.1 |
| 2008/0276563 A1* | 11/2008 | Gosis | F16B 7/0486 |
| | | | 52/656.9 |
| 2010/0083606 A1* | 4/2010 | Davis | E04B 1/24 |
| | | | 52/656.9 |
| 2017/0342736 A1* | 11/2017 | Roshinsky | E04B 2/767 |
| 2019/0111857 A1 | 4/2019 | Benedetti et al. | |
| 2020/0052438 A1* | 2/2020 | Sobel | H01R 13/6271 |
| 2020/0251854 A1* | 8/2020 | Sobel | E04B 2/7459 |
| 2020/0332514 A1* | 10/2020 | Sobel | F16B 5/0642 |
| 2021/0230860 A1* | 7/2021 | Langer | E04B 2/58 |
| 2021/0230867 A1* | 7/2021 | Langer | E04B 1/5818 |
| 2021/0372121 A1* | 12/2021 | Sobel | E04B 2/7409 |

* cited by examiner

SNAP CONNECTORS FOR WALL FRAMING

CROSS-REFERENCE TO RELATED APPLICATIONS

This U.S. non-provisional patent application claims the benefit of provisional patent application No. 63/094,868 filed on Oct. 21, 2020, which is hereby incorporated by reference to its entirety.

TECHNICAL FIELD

The present disclosure relates generally to construction and associated technologies; and more particularly, to various construction connections components configured to provide more efficient framing interconnections.

BACKGROUND

Traditional methods for constructing residential and commercial buildings remain, for the most part, unchanged. During construction of a building, it is common to frame walls using light gauge steel framing components. Most metal frame walls are built on-site by skilled carpenters and installation involves a labor-intensive process. For rough framing projects in the United States, it is common for labor costs to exceed three times the material cost. In addition, labor costs may increase with a reduction in workforce availability.

In a standard configuration, frame assemblies such as metal frame walls include "tracks" and "studs" (or "joists") which may be fastened together to form a wall frame. In general, a pair of tracks may be horizontally aligned in parallel along opposite ends of the wall, and studs may be positioned vertically between the tracks, typically at regular intervals (e.g., 16-inches on center). Each of the studs may then be manually secured to the tracks by engaging fasteners through the flanges of the tracks and the stud. Other joining methods may be used, such as welding and riveting. This process generally forms the supporting structure of the wall frame.

Connecting the studs with the tracks at the job site or during manufacturing presents various technical challenges. For example, it is generally critical to fasten the studs to the tracks using a fastening process that is capable of limiting lateral movement of the studs relative to the corresponding tracks so as to protect the integrity of the wall during building movement caused by expansion and contraction, wind forces, and seismic events. Yet, the fastening process must be cost and labor efficient. Studs and tracks widely available in the marketplace and/or commonly deployed for installation are shipped in large bundles of "raw" material and have standard dimensions and shape configurations (e.g., U-shaped or C-shaped); however, a cost-efficient and mechanically sound fastening process for these widely available components is lacking.

It is with these observations in mind, among others, that various aspects of the present disclosure were conceived and developed.

SUMMARY

The present disclosure provides a number of examples that describe construction framing assemblies and in particular a construction framing system with snap-fit connections that accommodates efficient and secure interconnections between a fastener (e.g., track anchor) and a track, and further between the track and a stud. In one illustrative example, the present disclosure takes the form of a framing system comprising a first connection assembly. The first connection assembly comprises a first connector including a base and a spring clasp defined along the base, with the first connector positioned along a track. The spring clasp includes a first spring flange defining at least one spring member and a first retention edge, and a second spring flange defining at least one spring member and a second retention edge, wherein the first connection assembly is configured such that a fastener engages the first and second retention edges and deflects the first and second spring flanges temporarily away from an original configuration, the first and second spring flanges biased to return to the original configuration to lock the first and second retention edges along the fastener. Engaging the track with the fastener interconnects the track with a substrate (e.g., foundational cement) supporting the fastener.

The base may define a first section, a second section, and a center section between the first section and the second section and may further define an opening extending through the center section that receives a portion of the fastener.

In some examples, to lock the first and second retention edges along the fastener the first and second retention edges are positioned along a groove of the fastener and abut a bottom edge of the fastener, restricting movement of the first connector from the fastener.

In some examples, each of the spring flanges may include a tail member seated along a bottom side of the base. The first plurality of spring members includes a first spring member extending vertically from the tail member and a second spring member in communication with the first spring member along an apex, the first spring flange configured to deflect as the first retention edge contacts the fastener such that the first spring member is temporarily brought closer to the second spring member. The first retention edge is defined at a terminal end of the first spring flange along a third spring member in communication with the second spring member of the first plurality of spring members. The first retention edge is oriented towards the second retention edge and at least a portion of the first retention edge underlaps and is visible through an opening formed through the base. The first connection assembly is seated along a web of a track, and the fastener is mounted to a substrate, such that the first connection assembly interconnects the substrate with the track.

The framing assembly further includes a second connection assembly that engages with the first connection assembly to interconnect framing components, the second connection assembly comprising a connector including: a body defining a first portion, and a second portion along opposite lateral sides of a center portion, a first aperture defined along the first portion, and a second aperture defined along the second portion, a first spring tab defined along the first aperture, and a second spring tab defined along the second aperture, wherein the second connection assembly is configured to assume a locked configuration over the first connection assembly such that the first tab and the second tab engage a locking arrangement defined along the spring clasp thereby interconnecting the first connection assembly to the second connection assembly.

In another illustrative example, the present disclosure takes the form of a framing system comprising a first connection assembly comprising a first connector, including: a spring clasp defined along a base, including a first spring flange defining a plurality of first spring members and a first retention edge, and a second spring flange defining a plurality of second spring members and a second retention edge, wherein the first and second retention edges are configured to temporarily shift laterally from an original configuration and then return to the original configuration to lock the first and second retention edges along a bottom edge defined by a fastener.

In some examples, the fastener engages the first and second retention edges and deflects the first and second spring flanges. In some examples, the fastener includes a stem, a sidewall formed over the stem, and a tapered end formed over the sidewall. The bottom edge of the fastener is defined at an intersection between the stem and the sidewall. The first spring flange include a plurality of ridges defined adjacent the first retention ridge. The first retention edge is defined between a first ridge of the plurality of ridges and a second ridge of the plurality of ridges. A portion of each of the plurality of ridges abuts the base along a center section, restricting upward movement of the first retention edge and facilitating a lateral movement of the first retention ridge as the first spring flange is deflected.

In another illustrative example, the present disclosure takes the form of a method of making a framing system comprising the steps of: forming a first connection assembly comprising a first connector, including: providing a base, and forming a spring clasp along the base, including forming a first spring flange defining a first retention edge, and forming a second spring flange defining a second retention edge, wherein the first and second retention edges are configured to temporarily shift laterally from an original configuration and then return to the original configuration to lock the first and second retention edges along a fastener.

The exemplary method may further include the steps of forming a second connection assembly including a second connector that engages with the first connection assembly to interconnect framing components including: forming a body defining a first portion, and a second portion along opposite lateral sides of a center portion, a first aperture defined along the first portion, and a second aperture defined along the second portion, forming a first spring tab along the first aperture, and forming a second spring tab along the second aperture, wherein the second connection assembly is configured to assume a locked configuration over the first connection assembly such that the first tab and the second tab engage a locking arrangement defined along the spring clasp thereby interconnecting the first connection assembly to the second connection assembly.

The foregoing examples broadly outline various aspects, features, and technical advantages of examples according to the disclosure in order that the detailed description that follows may be better understood. It is further appreciated that the above operations described in the context of the illustrative example method, device, and computer-readable medium are not required and that one or more operations may be excluded and/or other additional operations discussed herein may be included. Additional features and advantages will be described hereinafter. The conception and specific examples illustrated and described herein may be readily utilized as a basis for modifying or designing other structures for carrying out the same purposes of the present disclosure. Such equivalent constructions do not depart from the spirit and scope of the appended claims.

BRIEF DESCRIPTION OF THE DRAWINGS

The examples herein may be better understood by referring to the following description in conjunction with the accompanying drawings in which like reference numbers indicate the same or functionally similar elements. Understanding that these drawings depict only exemplary examples of the disclosure and are not therefore to be considered to be limiting of its scope, the principles herein are described and explained with additional specificity and detail through the use of the accompanying drawings in which.

Corresponding reference characters indicate corresponding elements among the view of the drawings. The headings used in the figures do not limit the scope of the claims.

DESCRIPTION

Overview.

It is desirable to introduce an efficient and mechanically sound framing system with snap-fit engagements that interconnects various framing components. According to one or more examples or examples of the present disclosure, the framing system described herein generally includes a first connection assembly. The first connection assembly includes a first connector and a track. At least one spring flange defined by the first connector engages with a fastener (e.g., track anchor) positioned along a substrate to maintain the first connection assembly in a fixed position relative to the substrate and to interconnect the substrate with the track. The framing system further includes a second connection assembly defining a second connector engaged to a stud. The second connection assembly engages with the first connection assembly to interconnect the stud with the track.

Description.

Various examples of the disclosure are discussed in detail below. While specific implementations are discussed, it should be understood that this is done for illustration purposes only. A person skilled in the relevant art will recognize that other components and configurations may be used without parting from the spirit and scope of the disclosure.

As used herein, the terms "building," "structure," and/or "construction site" may be used interchangeably and generally refer to a physical structure on real property such as residential or commercial properties.

Figure 1:
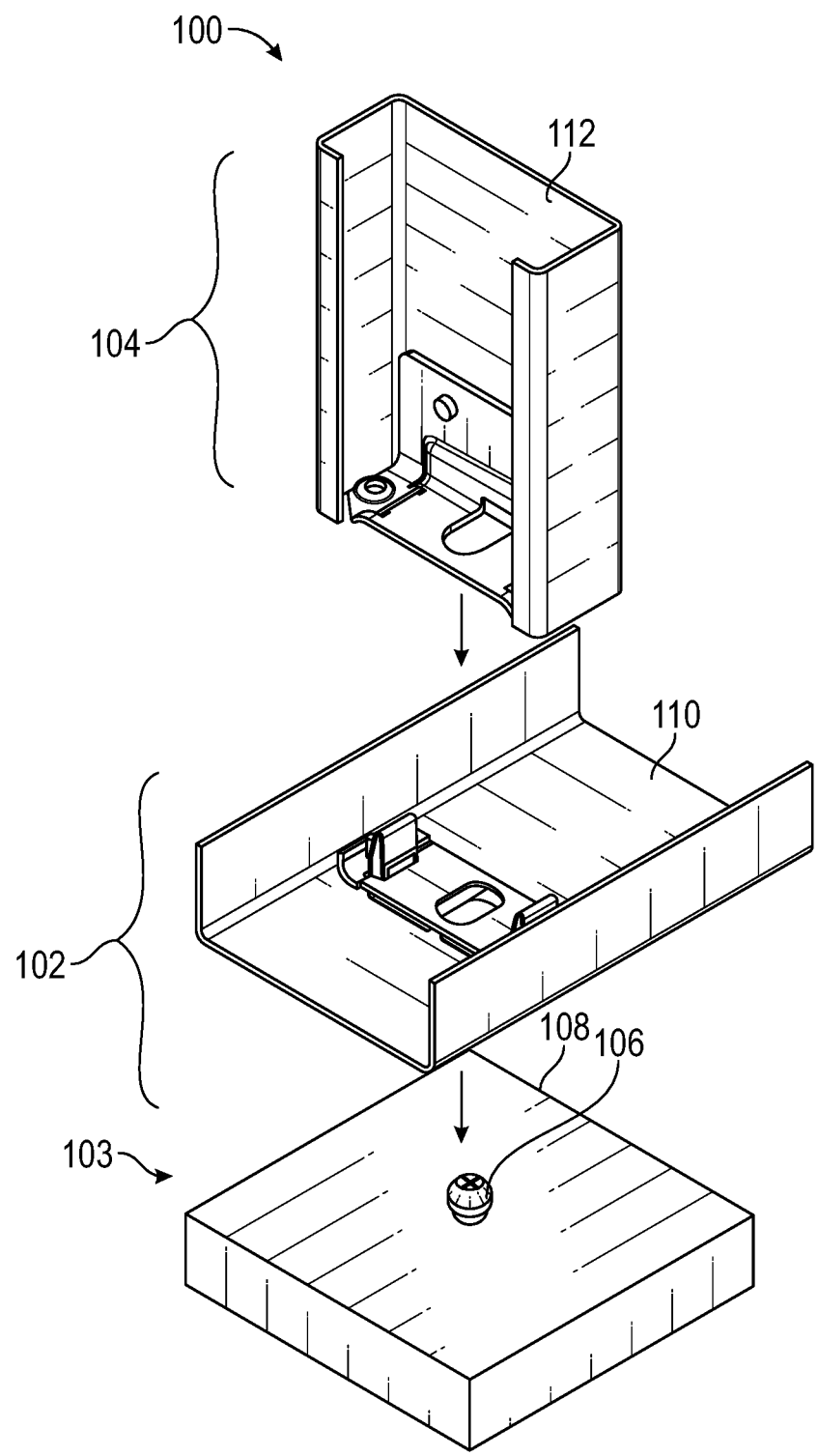
FIG. 1 is an exploded view of a framing system including a first connection assembly that engages a fastener and a second connection assembly that engages the first connection assembly to interconnect framing components.

Referring to FIG. 1, a framing system 100 is presented that accommodates the interconnection of various framing components described herein. In some examples, the framing system 100 includes a first connection assembly 102 mounted to or formed integrally with a track 110. In general, the first connection assembly 102 is configured for engagement with a fastener 106 (e.g., track anchor) mounted along a substrate 108 such as a concrete block or other foundational construction component via an anchor mechanism 103 to interconnect the track 110 with the substrate 108 as described herein. In other examples, the framing system 100 further includes a second connection assembly 104 mounted to or formed integrally with a stud 112. When implemented, the second connection assembly 104 engages with the first connection assembly 102 to interconnect the track 110 to the stud 112. It should be understood and appreciated that example implementations of the framing system 100 may include two or more of any combination of the first connection assembly 102, the second connection assembly 104, and the substrate 108. In other words, one example of the framing system 100 may include the first connection assembly 102 and the substrate 108 (devoid of the second connection assembly 104), another example may include the first connection assembly 102 and the second connection assembly 104 (devoid of the fastener 106 and substrate 108), and another example may include all of the first connection assembly 102, the fastener 106 and substrate 108, and the second connection assembly 104. The components of FIG. 1 may be formed using steel or any number or type of metal or composition thereof, and/or may be formed using any material capable of providing structural framing for a building of any kind.

Figure 2A:
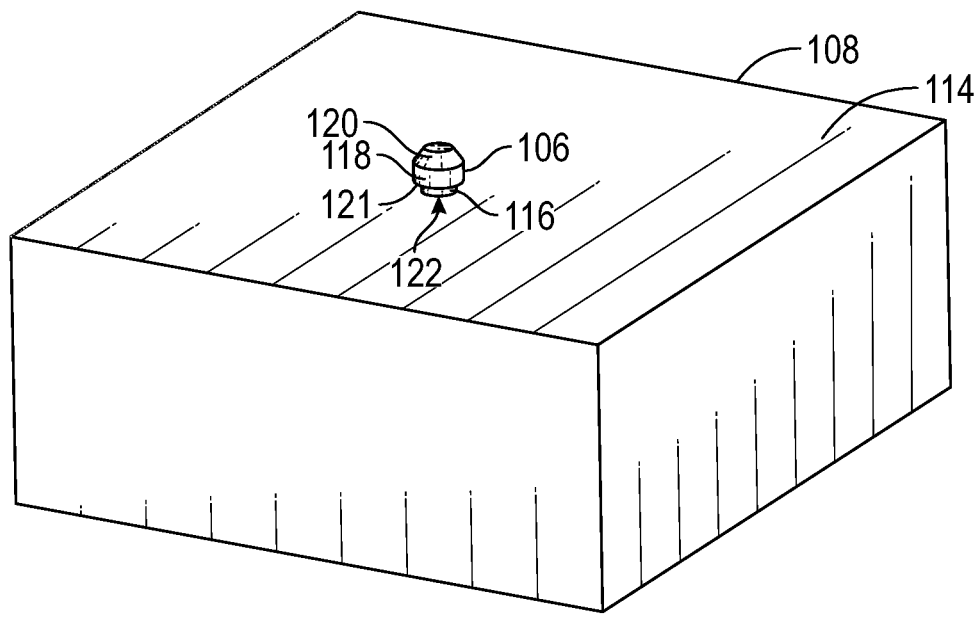
FIG. 2A is an isometric view of a fastener mounted along a substrate prior to engagement with the first connection assembly.
Figure 2B:
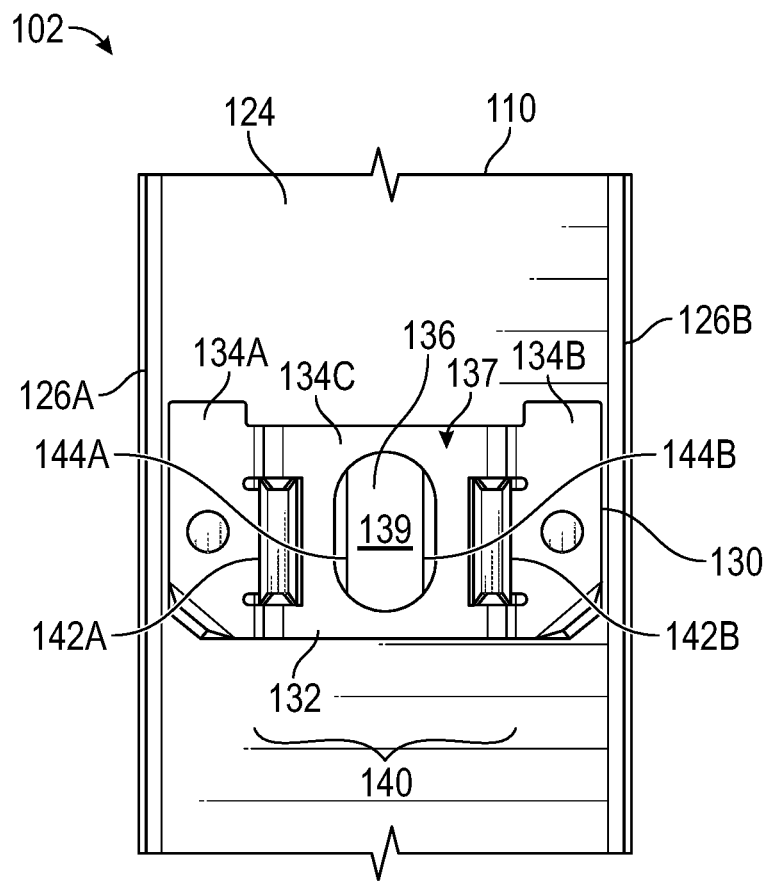
FIG. 2B is a top view of the first connection assembly prior to engagement with the fastener.

FIGS. 2A-2J illustrate further detail followed by exemplary engagement of the first connection assembly 102 to the fastener 106 to interconnect the track 110 with the substrate 108. Referring to FIG. 2A, the substrate 108 and fastener 106 are illustrated prior to engagement. As stated previously, the substrate 108 includes any foundational structure of the framing system 100, and may define a rectangular prism shape configuration, with the fastener extending from a surface 114 of the substrate 108. As further shown, the fastener 106 generally includes a stem 116, a sidewall 118, and a tapered end 120. As indicated, the sidewall 118 is wider than the stem 116, extends axially away from the stem 116, and defines a bottom edge 121. As such, an annular groove 122 is further defined around the fastener 106 along the bottom edge 121 of the sidewall 118 and the stem 116.

Referring to FIGS. 2B-2E, the first connection assembly 102 generally includes a first connector 130 that may be positioned, seated, or formed along a web 124 of a track 110 between a first track flange 126A and a second track flange 126B as shown. The first connector 130 includes a base 132 defining a first section 134A, a second section 134B, and a center section 134C between the first section 134A and the second section 134B. In some examples, the base 132 further defines an opening 136 extending through the center section 134C. Likewise, the web 124 of the track 110 includes a track opening 137 that may be vertically aligned over the opening 136 of the first connector 130 to form a channel 139 through the first connection assembly 102, that receives at least a portion of the fastener 106 as further described herein.

In addition (more conveniently illustrated in FIG. 2C), the first connector 130 includes a spring clasp 140 defined along the base 132. In general, the spring clasp 140 includes at least one of a spring flange 142 defining at least one retention edge 144 that engages with the fastener 106 as described herein. While the example presented illustrates a pair of spring flanges (142A and 142B), it is contemplated that additional other example implementations of the first connection assembly 102 may include one or three or more spring flanges without departing from the spirit and scope of the connection features described herein. In addition, the spring clasp 140 may be integrally formed with the base 132.

Continuing with the non-limiting example shown, the spring clasp 140 includes a first spring flange 142A and a second spring flange 142B in general parallel alignment over the web 124 of the track 110. The first spring flange 142A includes a tail member 146A seated along the web 124 of the track 110 and along a bottom side of the base 132, and a plurality of spring members including a first spring member 148A extending vertically from the tail member 146A. The first spring flange 142A further includes a second spring member 150A in communication with the first spring member 148A along an apex 152A, such that the second spring member 150A extends back towards the web 124. The first spring flange 142A further includes a third spring member 154A in orthogonal relation relative to the second spring member 150A that extends along the web 124 similar to the tail member 146A. As shown, a retention edge 144A of the first spring flange 142A is defined along the third spring member 154A.

Similarly, the second spring flange 142B includes a tail member 146B seated along the web 124 of the track 110, and a first spring member 148B extending vertically from the tail member 146B. The second spring flange 142B further includes a second spring member 150B in communication with the first spring member 148B along an apex 152B, such that the second spring member 150B extends back towards the web 124. The second spring flange 142B further includes a third spring member 154B in orthogonal relation relative to the second spring member 150B that extends along the web 124 similar to the tail member 146B. As shown, a retention edge 144B of the second spring flange 142B is defined along the third spring member 154B. In the example shown, the first retention edge 144A is oriented towards the second retention edge 144B. However, in other exemplary implementations the retention edges 144 can be positioned in different locations.

In some examples, the tail members 146 of the spring flanges 142 are fixed relative to the base 132 and/or the track 110. By contrast, the third spring members 154 are devoid of any such fixation to the web 124 or base 132 and are capable of some predetermined degree of lateral movement along the web 124. As such, and as further described herein, while the first spring members 148, second spring members 150, and third spring members 154 are biased to the original position shown in FIG. 2C, at least a portion of the subject components are configured for deflection or compression relative to respective tail members 146. In other words, compression or deflection of the spring flanges 142 temporarily shifts the retention edges 144 away from one another and from the opening 136, and consequently further shifts the third spring members 154 away from the opening 136 and towards the tail members 146.

Figure 2C:
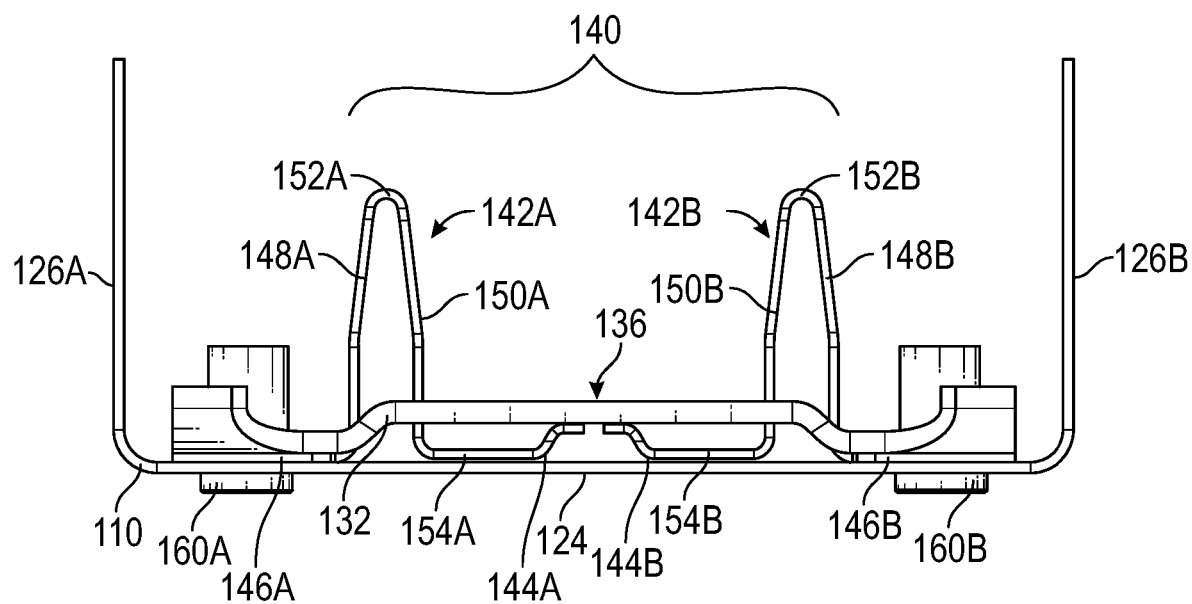
FIG. 2C is an enhanced side view of the first connection assembly.
Figure 2D:
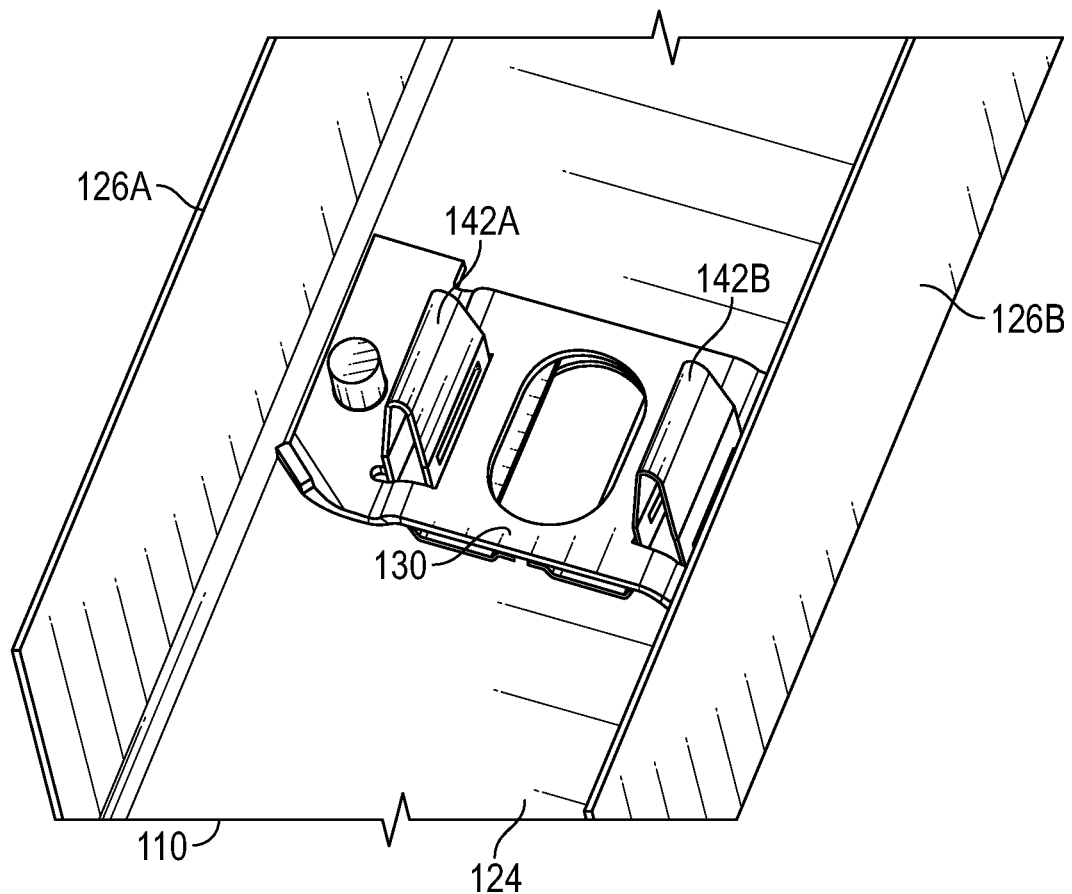
FIGS. 2D-2E are different oblique views of the first connection assembly.

As indicated in FIG. 2C, a pair of rivets 160, designated rivet 160A and rivet 160B may be passed through the web 124 and may be implemented to mount the first connector 130 along the web 124 in examples where the first connector 130 is not formed together or integral to the track 110. The rivets 160 may extend partially below the web 124 to create some separation between the track 110 and the substrate 108 during engagement, or bottom sides of the rivets 160 may be flush with the bottom of the web 124. Alternatively, the first connector 130 may be welded to the track 110, formed together with the track 110 as a single component, or otherwise mounted via an adhesive, any other types of fasteners, and the like.

Figure 2E:
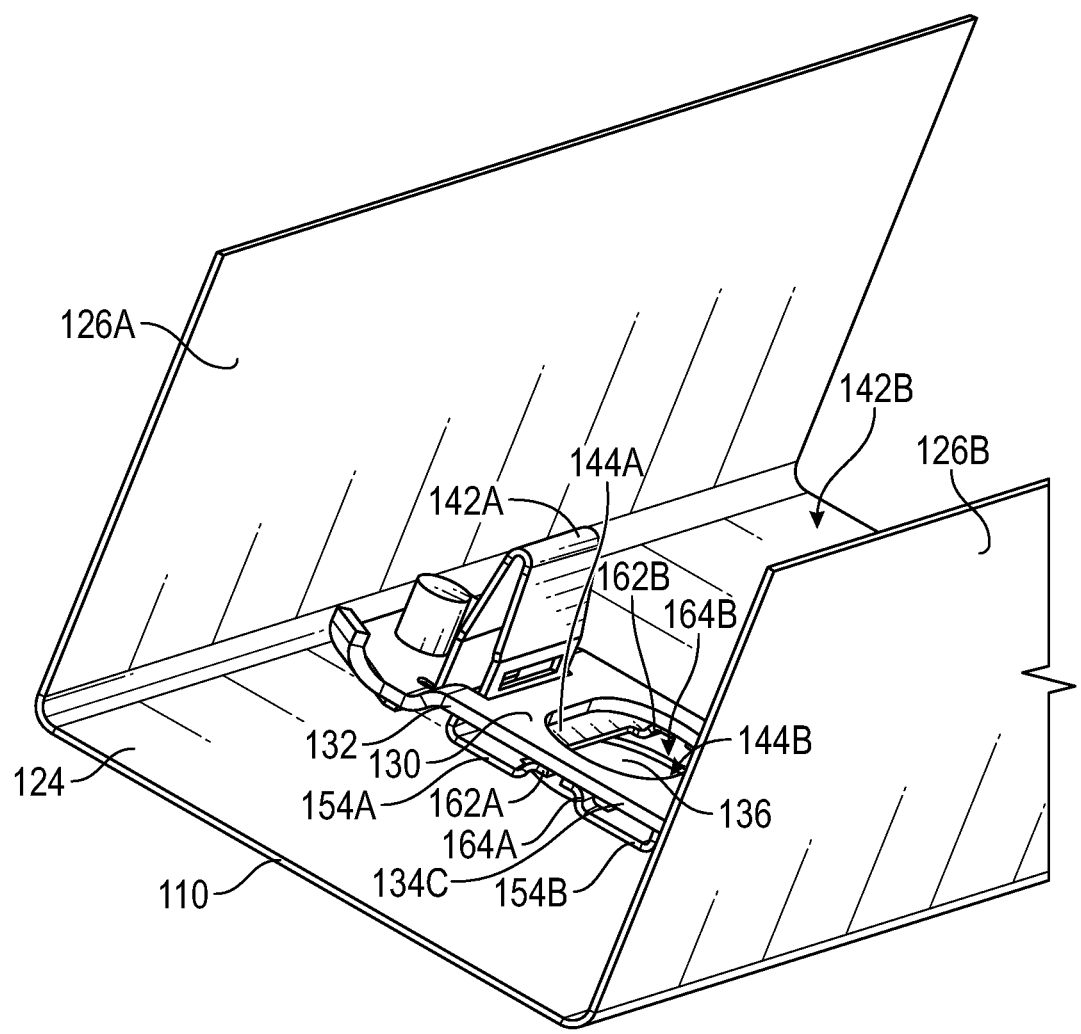

Referring to FIG. 2E, in some examples, the spring flanges 142 include s-shaped ridges defined along opposite ends of the third spring members 154 adjacent the retention edges 144. Specifically, for example, a ridge 162A may be defined along the third spring member 154A of the spring flange 142A adjacent the retention edge 144A and proximate to one side of the opening 136, and a ridge 162B may be defined along the third spring member 154A proximate to an opposite side of the opening 136 as indicated. In this configuration, the retention edge 144A is essentially defined between the ridge 162A and the ridge 162B. Similarly, a ridge 164A may be defined along the third spring member 154B of the spring flange 142B adjacent the retention edge 144B and proximate to one side of the opening 136, and a ridge 164B may be defined along the third spring member 154B proximate to an opposite side of the opening 136 as indicated. In this configuration, the retention edge 144B is essentially defined between the ridge 164A and the ridge 164B. In these examples, a portion of the ridges 162 and 164 abuts the base 132 along the center section 134C as indicated, restricted upward movement of the retention edges 144 and instead facilitating the lateral movement of the spring members 154 and deflection of the spring flanges 142 as described.

Figure 2F:
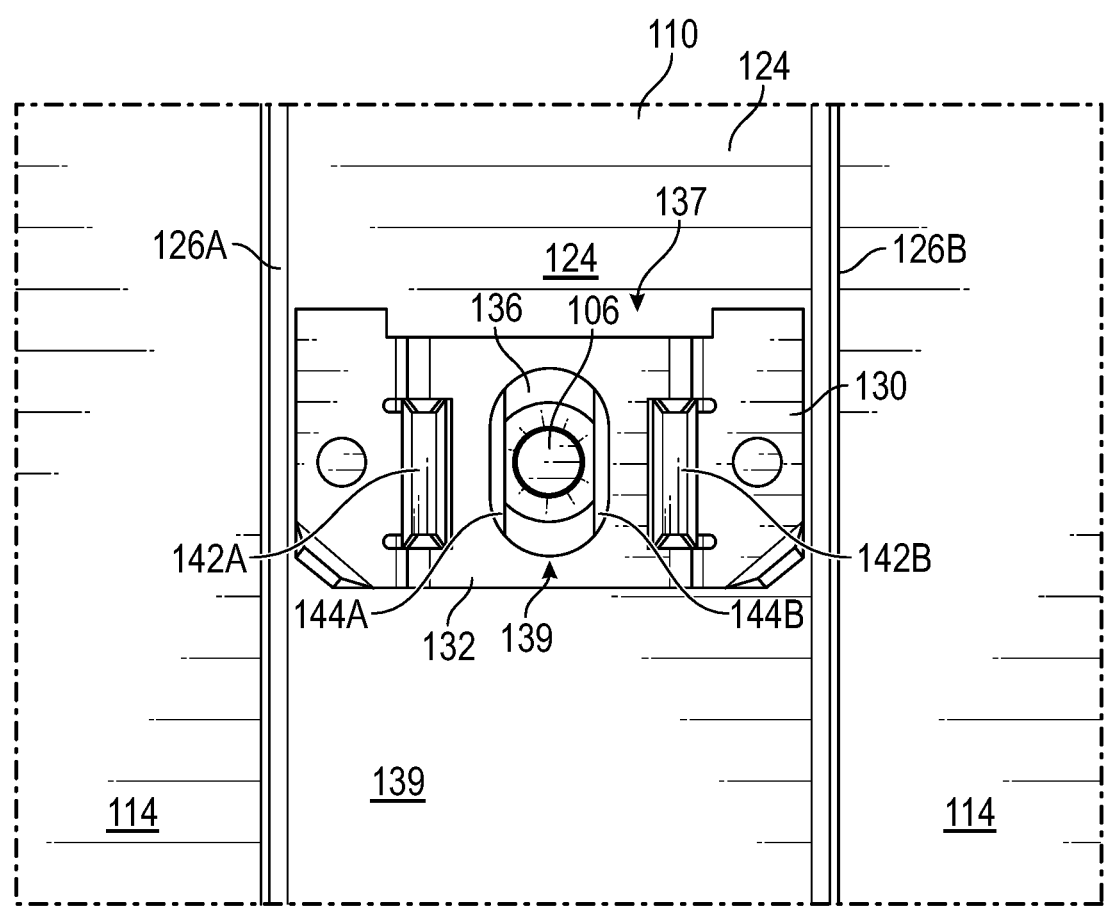
FIG. 2F is a top view of the first connection assembly positioned over the fastener and the substrate.
Figure 2G:
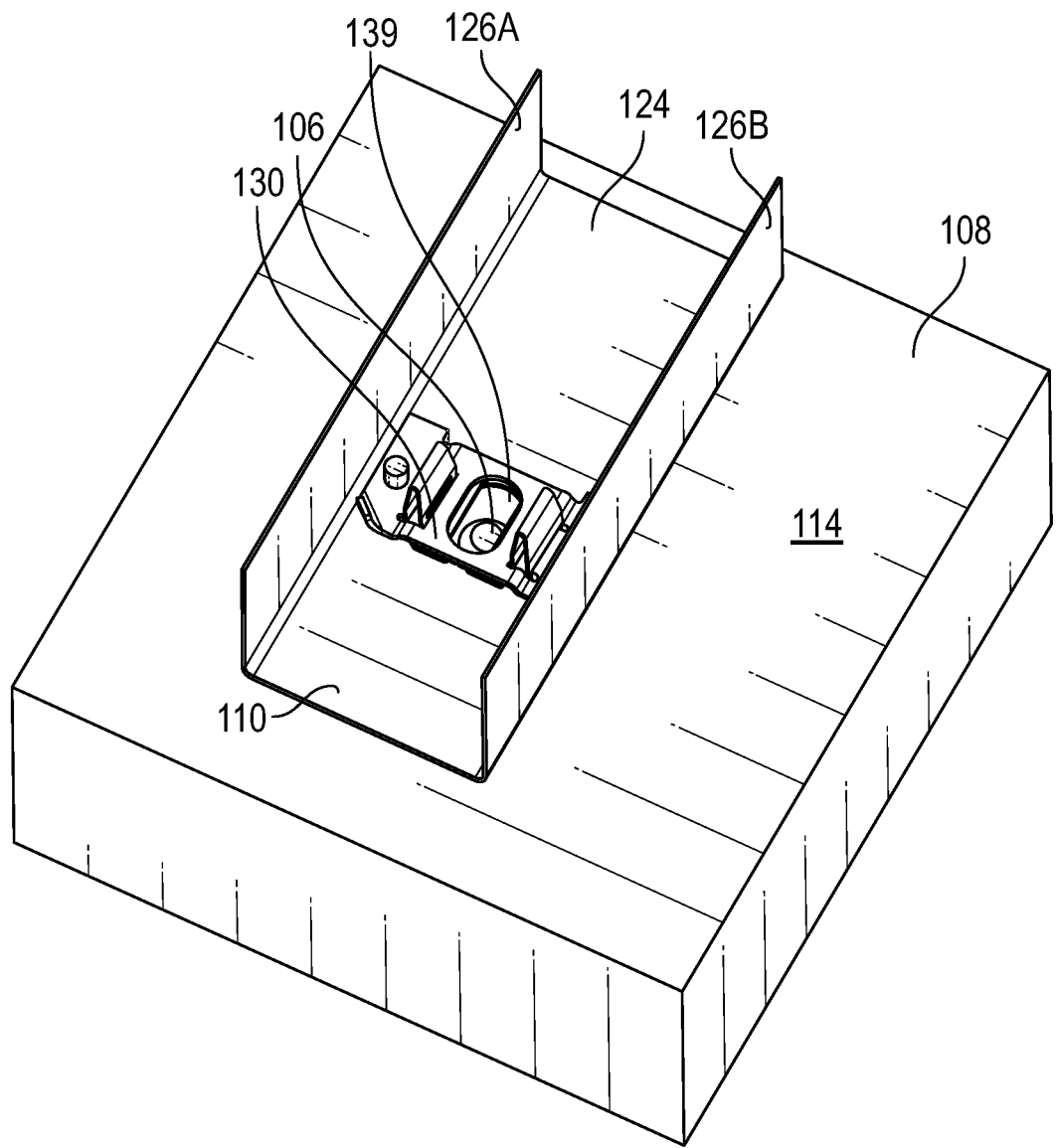
FIG. 2G is an oblique view of the first connection assembly positioned over the fastener and the substrate.
Figure 2H:
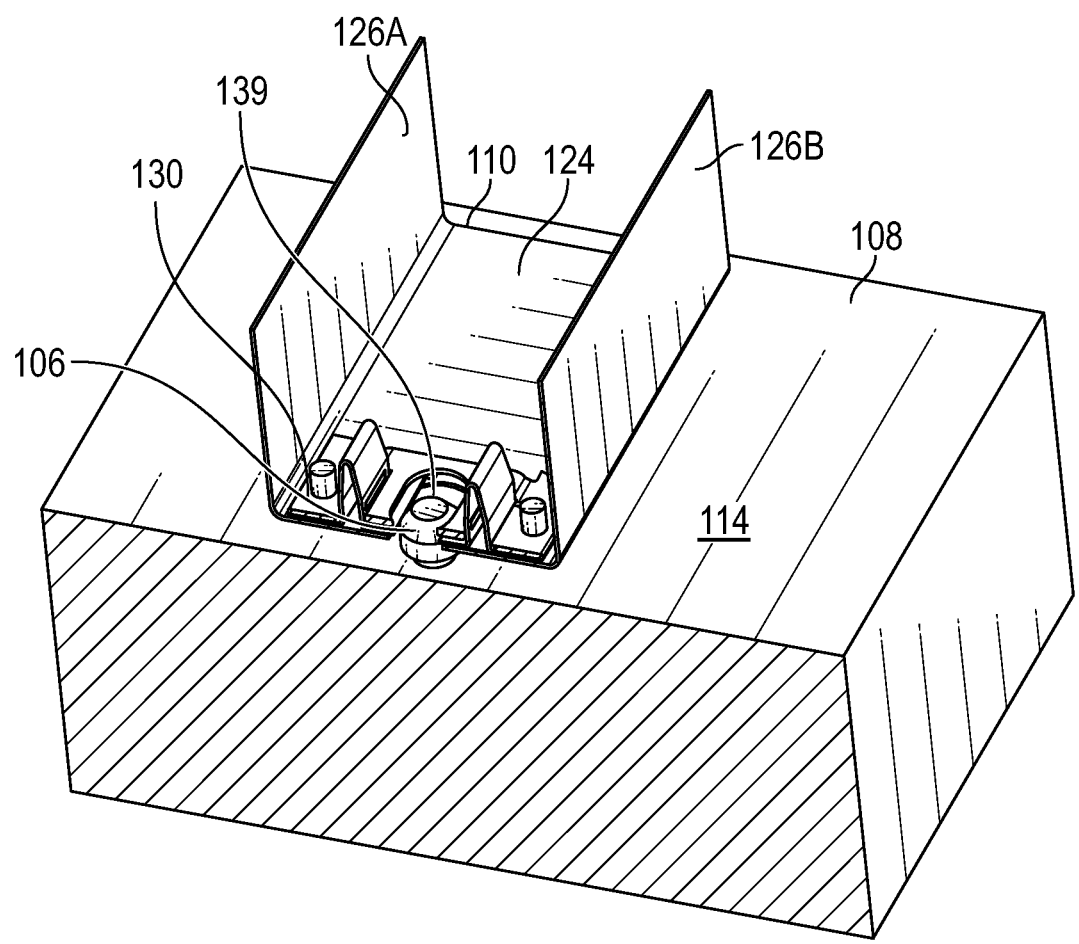
FIG. 2H is another oblique view of the first connection assembly positioned over the fastener and the substrate with a portion of the first connection assembly and the substrate cut away to provide additional connection detail.

FIGS. 2F-2J detail an example of the first connection assembly 102 being engaged with the fastener 106 to interconnect the track 110 to the substrate 108 such that the bottom side of the web 124 extends over the surface 114 of the substrate 108 (e.g., FIG. 2J), referred to herein as an "anchor mechanism" (103). FIGS. 2F-2H illustrate the initial stages of the anchor mechanism as the first connection assembly 102 is positioned and aligned over the substrate 108. Specifically, the first connection assembly 102 may be positioned over the substrate 108 such that the fastener 106 is vertically aligned with the channel 139 and at least partially visible from a top view as indicated in FIG. 2F.

Figure 2I:
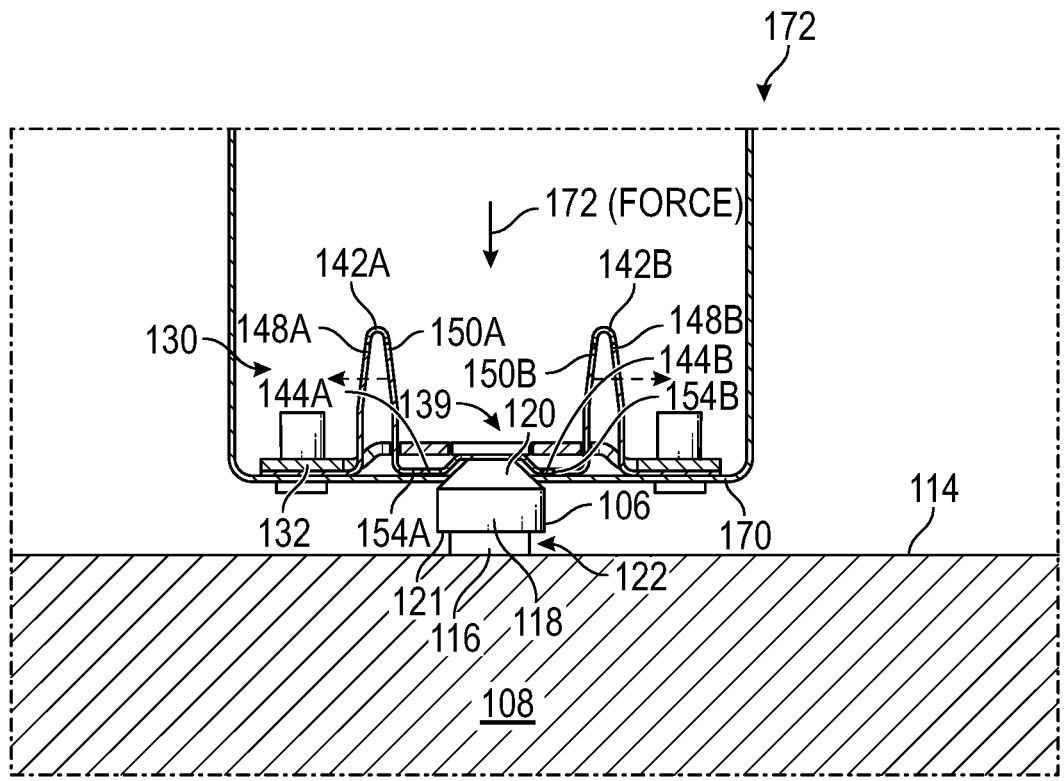
FIG. 2I is a cross-sectional view of the first connection assembly in an initial stage of an anchor mechanism, the first connection assembly positioned over the fastener and the substrate with the spring clasp of the first connection assembly engaging the fastener prior to deflection.
Figure 2J:
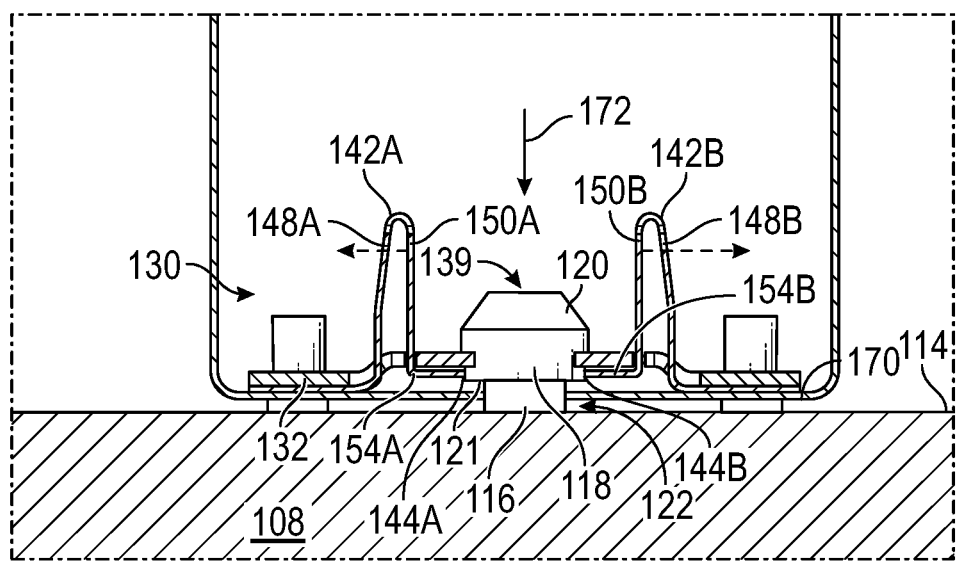
FIG. 2J is a cross-sectional view of the first connection assembly positioned over the fastener and the substrate in another stage of the anchor mechanism with the spring assembly of the first connection assembly temporarily deflected about the fastener as illustrated by the engagement shown in FIG. 2I.

FIGS. 2I-2L illustrate various stages for connecting the first connection assembly 102 with the fastener 106 once the components are aligned as previously indicated in FIGS. 2F-2H. In FIG. 2I, a bottom side 170 of the first connection assembly 102 is brought over the surface 114 of the substrate 108 such that the tapered end 120 of the fastener 106 partially passes through the channel 139 and contacts the retention edges 144 as shown. The dashed arrows of FIG. 2I indicate that application of a force 172 to the first connection assembly 102 in the direction shown causes the retention edges 144 to contact the fastener and then shift away down along the tapered end 120, and temporarily deflects the spring flanges 142 such that the retention edges 144 spread apart and the second spring members 150 temporarily compress and/or shift towards the first spring members 148. FIG. 2J illustrates a mid-connection stage where the spring flanges 142 are temporarily deflected as described, with the retention edges 144 passing beyond the tapered end 120 and down along the sidewall 118 of the fastener 106. As indicated, the tapered end 120 facilitates the engagement and deflection of the retention edges 144 and the deflection of the spring flanges 142 generally.

Figure 2K:
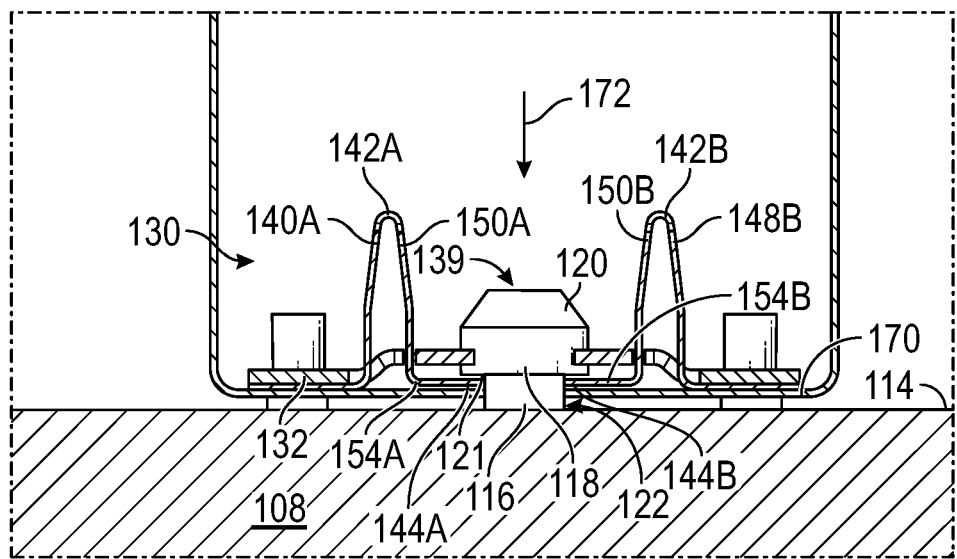
FIG. 2K is a cross-sectional view illustrating retention edges of the spring clasp of the first connection assembly fully seated and locked under a bottom edge of the fastener in another stage of the anchor mechanism to maintain the first connection assembly in a fixed position relative to the substrate.
Figure 2L:
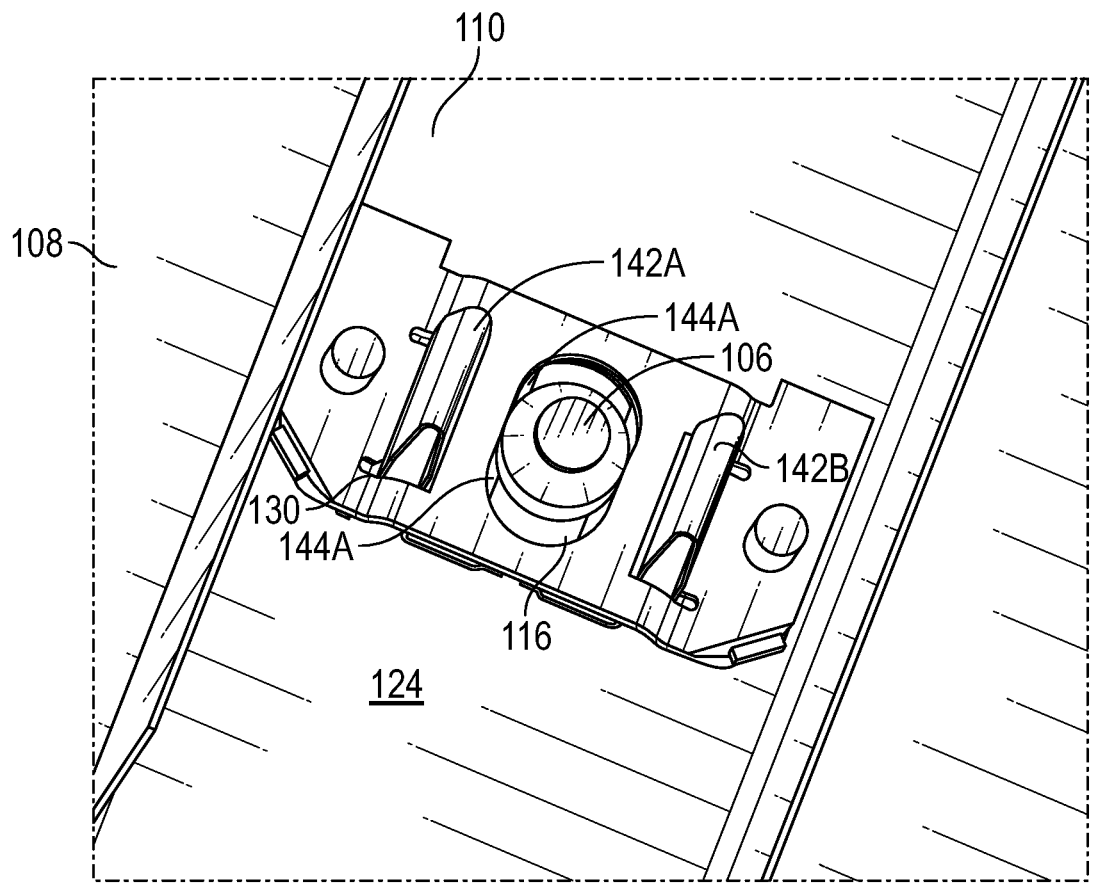
FIG. 2L is an oblique view from a top angle illustrating the final stage of the anchor mechanism with the first connection assembly mounted to the fastener that interconnects the track with the substrate.

As illustrated in FIG. 2K, continued application of the force 172 results in the retention edges 144 clearing the sidewall 118, decompressing, and snapping back to the original (non-deflected) configuration (example in FIG. 2C) with the retention edges 144 aligned along the groove 122. As indicated, in this stage, the retention edges 144 abut and are locked below the bottom edge 121 of the fastener 106, thereby maintaining the first connection assembly 102 in a fixed position relative to the substrate 108. In addition, the subject engagement interconnects the substrate 108 with the track 110. Accordingly, the first connection assembly 102 is configured to receive the fastener 106 through the channel 139, the retention edges 144 are configured to engage the fastener 106 thereby consequently deflecting the spring flanges 142 away from one another and away from an original configuration, and the spring flanges 142 are biased to return to the original configuration to lock the retention edges 144 along the fastener 106.

Figure 3A:
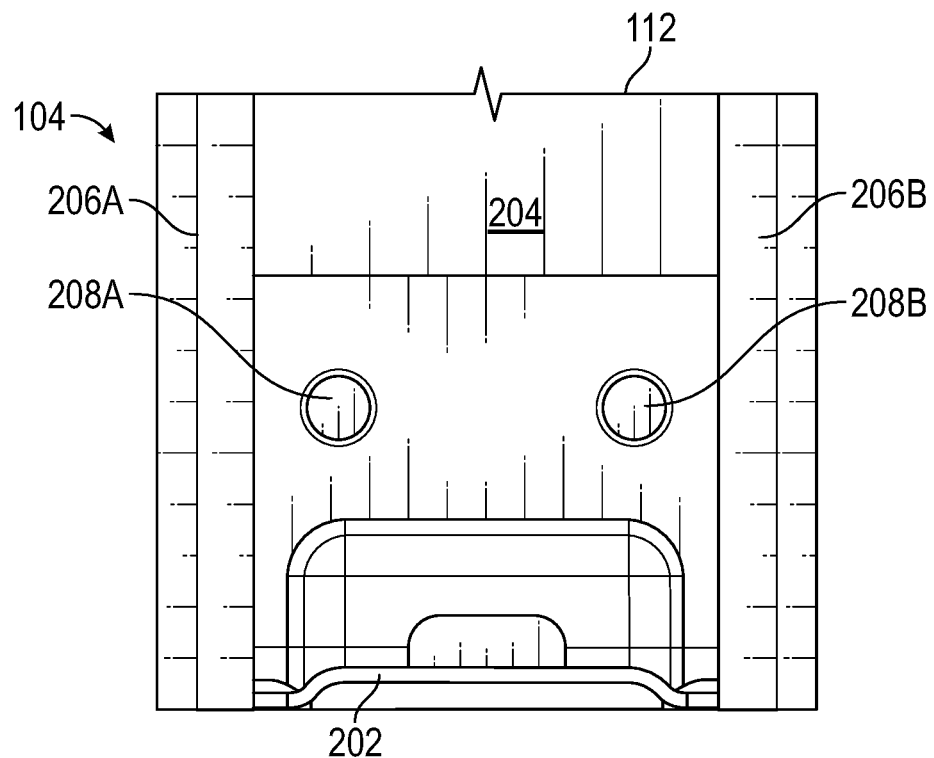
FIG. 3A is front view of a second connection assembly configured for connection with the first connection assembly including a second connector engaged to a stud.
Figure 3B:
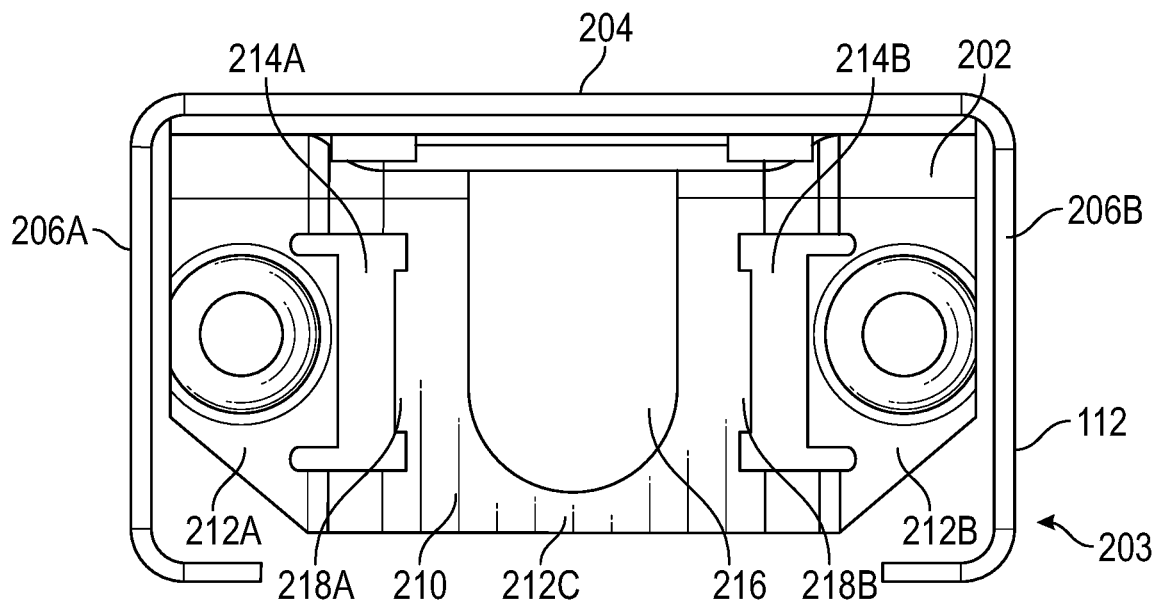
FIG. 3B is a top view of the second connection assembly.
Figure 3C:
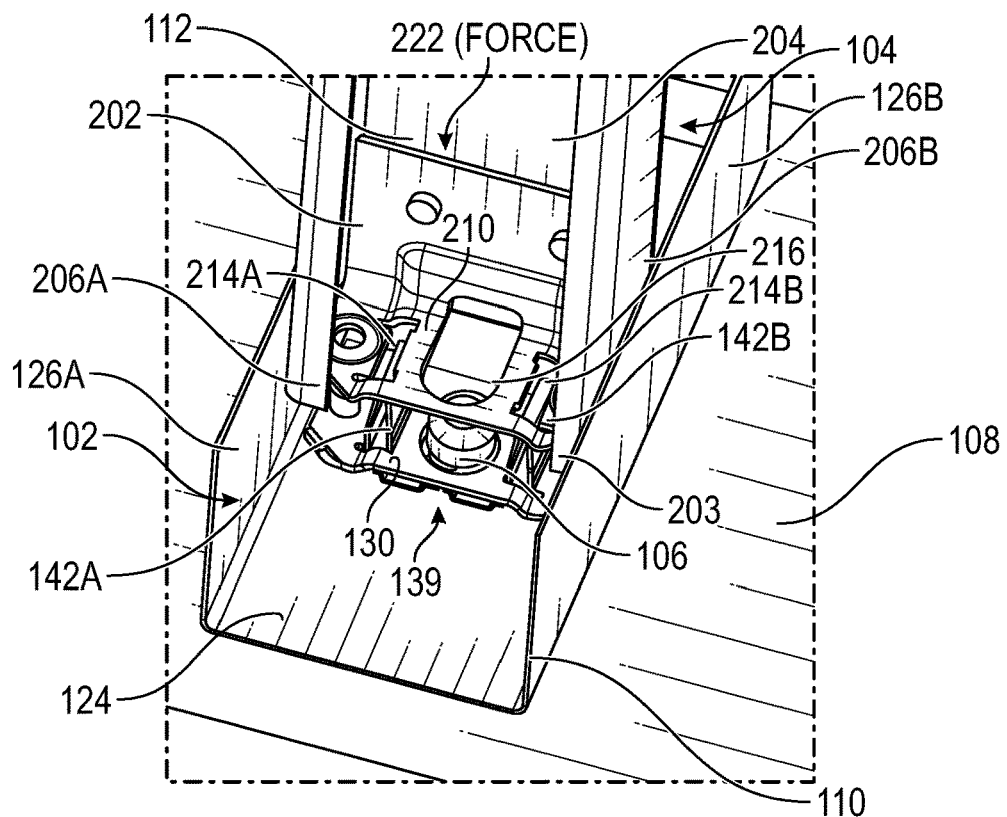
FIG. 3C is an oblique view of the second connection assembly aligned over the first connection assembly in an initial stage of a connection mechanism.

Referring to FIGS. 3A-3C, the framing system 100 may further include the second connection assembly 104. The second connection assembly 104 generally includes a second connector 202 that may be positioned, seated, or formed along a terminal end 203 of the web 204 of the stud 112 between a first stud flange 206A and a second stud flange 206B as shown. In some examples, at least a portion of the second connector 202 is mounted to the stud 112 using rivets 208 or other fasteners, shown as rivet 208A and rivet 208B in FIG. 3A. Alternatively, the second connector 202 may be formed integrally with the stud 112, or fastened to the stud 112 by welding, an adhesive, and the like.

As shown in FIG. 3B, the second connector 202 of the second connection assembly 104 generally includes a body 210 defining a first side portion 212A and a second side portion 212B along opposite sides of a center portion 212C. In some examples, the body 210 further includes a first spring aperture 214A defined along the intersection of the first side portion 212A and the center portion 212C, and a second spring aperture 214B defined along the intersection of the second side portion 212B and the center portion 212C. In general, each of the spring apertures 214 is shaped such that at least a portion of the first spring member 148 and the second spring member 150 of a respective spring flange 142 can pass through each spring aperture 214. As further shown, additional examples of the second connector 202 include a connection opening 216 formed through the center portion 212C of the body 210. The connection opening 216 is formed to accommodate vertical alignment with the channel 139 formed by the opening 136 and the opening 137 of the first connection assembly 102, as further described herein.

In addition, the second connector 202 includes a first tab 218A formed along the first spring aperture 214A, and a second tab 218B formed along the second spring aperture 214B. As illustrated by the following examples, the tabs 218 are configured for connection with the spring flanges 142. In general, as further described herein, the second connection assembly 104 defines a connection mechanism whereby the body 201 of the second connector 202 is positioned over the first connection assembly 102, and the tabs 218 engage the spring flanges 142 to maintain the second connection assembly 104 in a fixed position relative to the first connection assembly 102, interconnecting the track 110 to the stud 112 (as further described herein).

Referring to FIGS. 3C-3H, various stages of the connection mechanism for engaging the second connection assembly 104 with the first connection assembly 102 to interconnect the stud 112 with the track 110 are illustrated. Referencing FIG. 3C, in an initial stage of the connection mechanism, the second connection assembly 104 is aligned over the first connection assembly 102 as shown such that the opening 216 of the body 210 is vertically aligned over the fastener 106 and the channel 139. In addition, the spring apertures 214 are aligned over the spring flanges 142 as shown. As further shown, by nature of the previous engagement of the second connector 202 to the stud 112, the stud 112 is positioned with the terminal end 203 oriented towards the web 124 of the track 110, such that the stud 112 is in perpendicular alignment relative to the track 110. In this manner, at least a portion of the second connection assembly 104 extends between the first track flange 126A and the second track flange 126B.

Figure 3D:
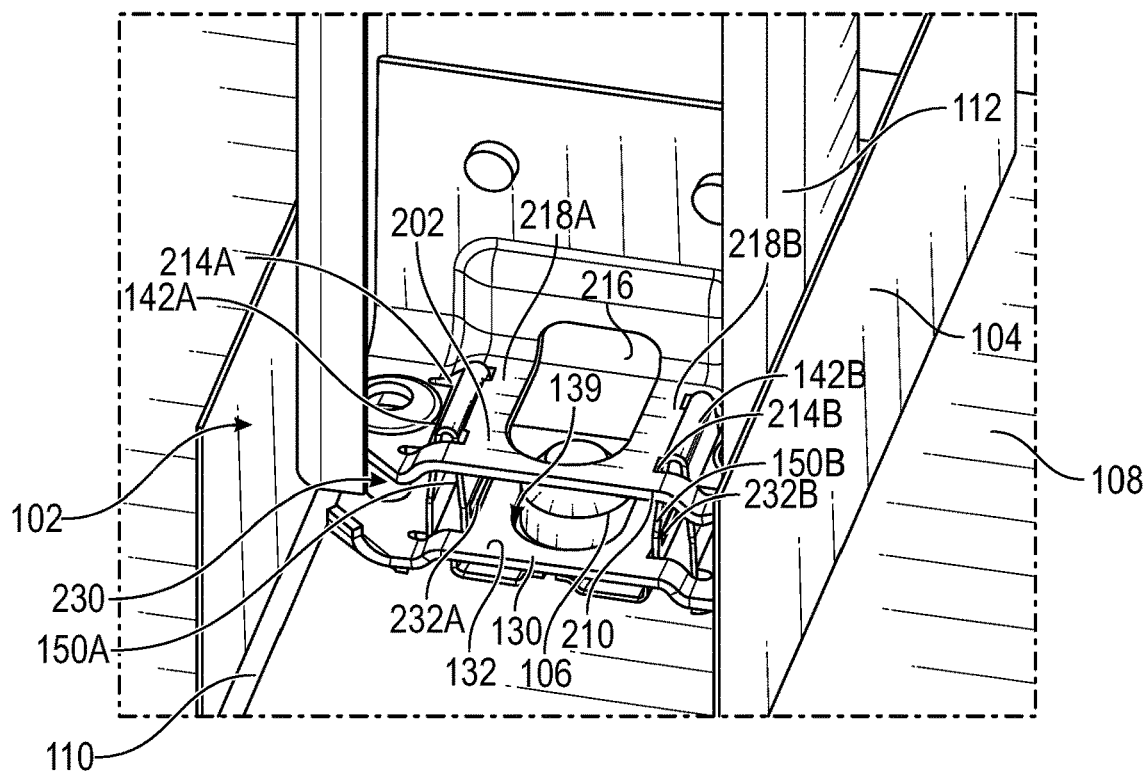
FIG. 3D is an oblique view of the second connection assembly in another stage of the connection mechanism with the first connection assembly.
Figure 3E:
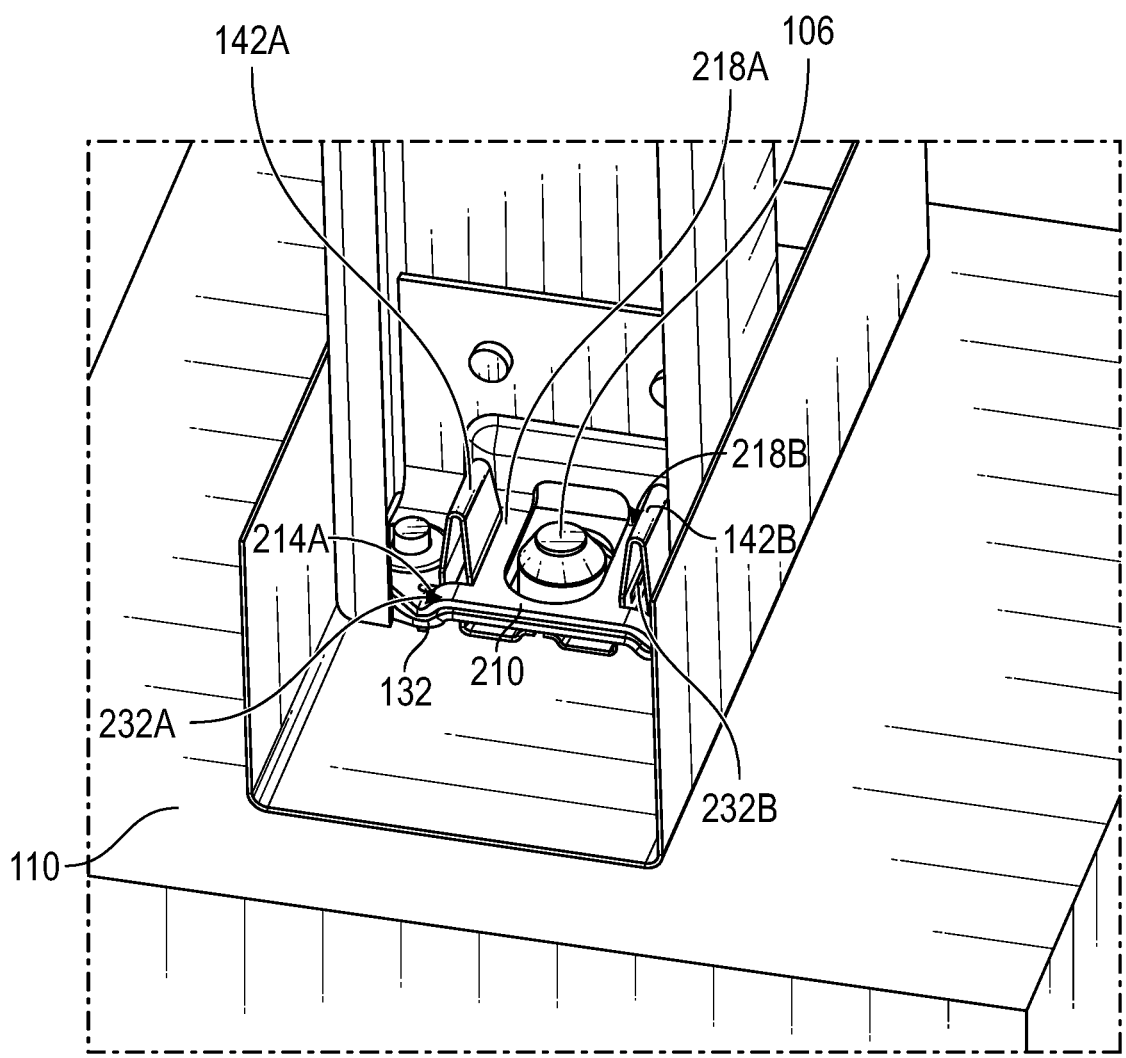
FIG. 3E is another oblique view illustrating a seated stage of the connection mechanism with the second connection assembly snapped into place along the first connection assembly to interconnect the track with the stud.
Figure 3F:
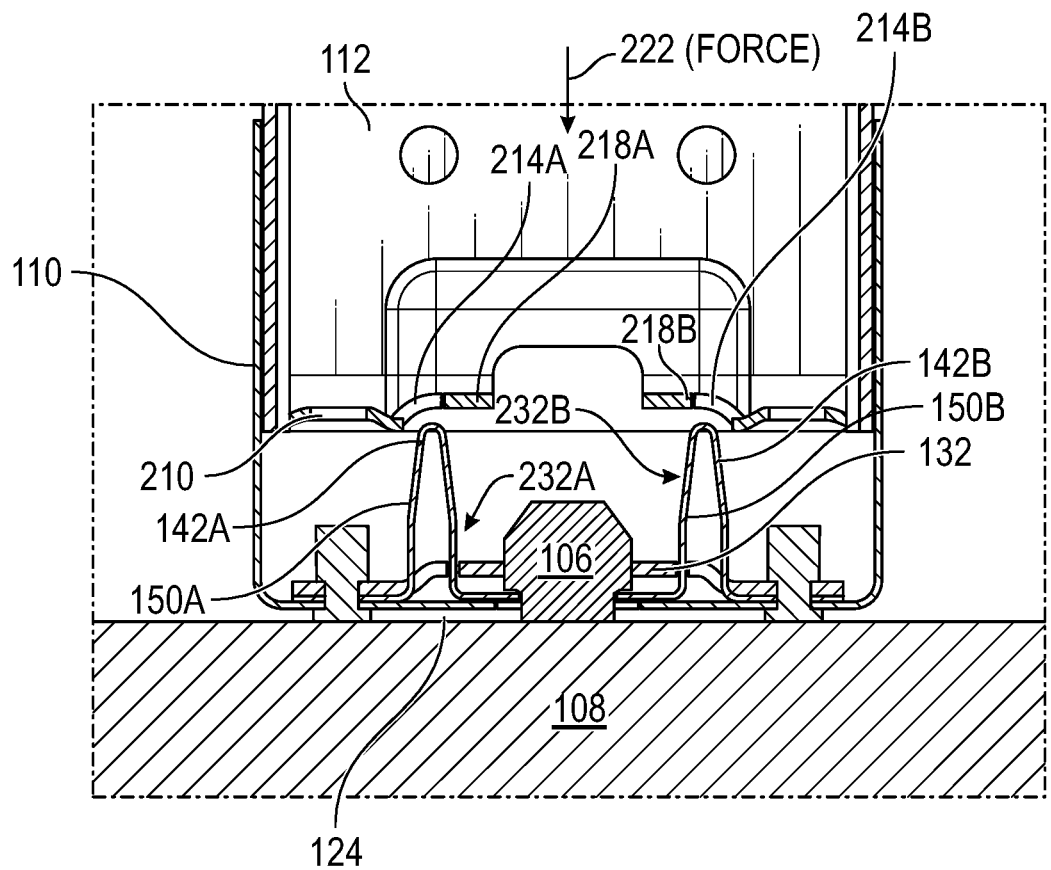
FIGS. 3F-3H provide additional cross-sectional illustrations of the connection mechanism for engaging the second connection assembly with the first connection assembly.
Figure 3G:
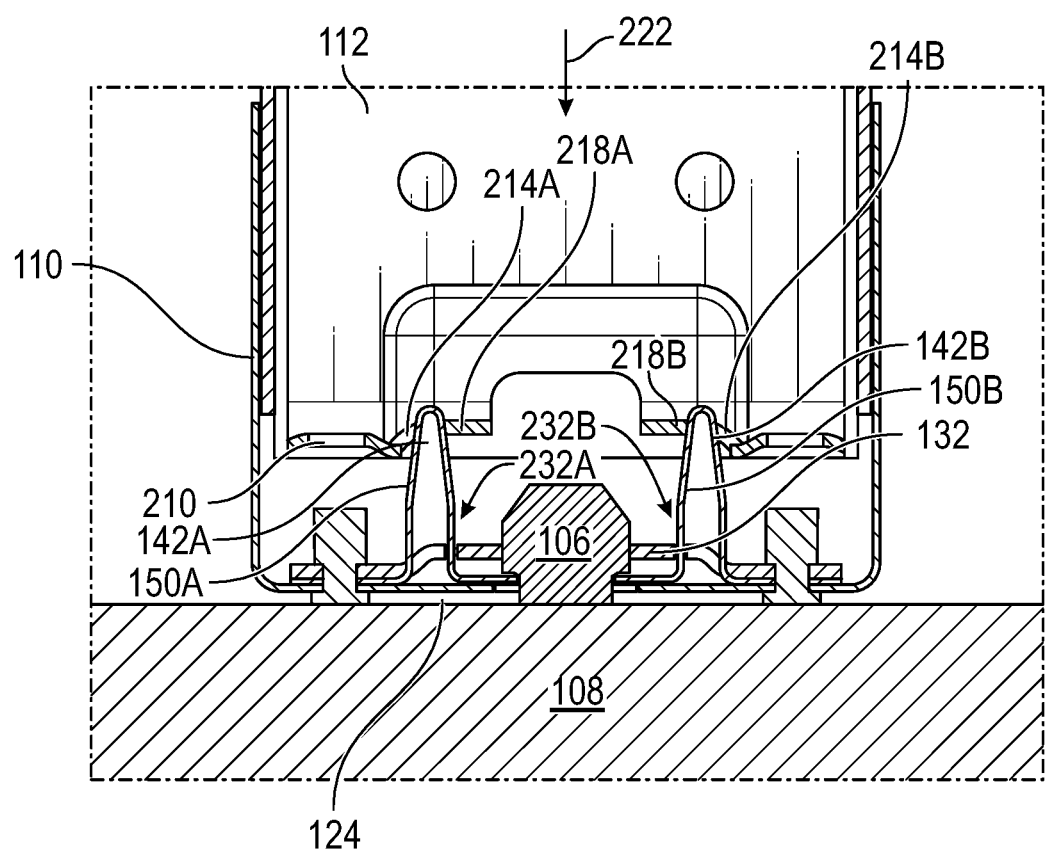
Figure 3H:
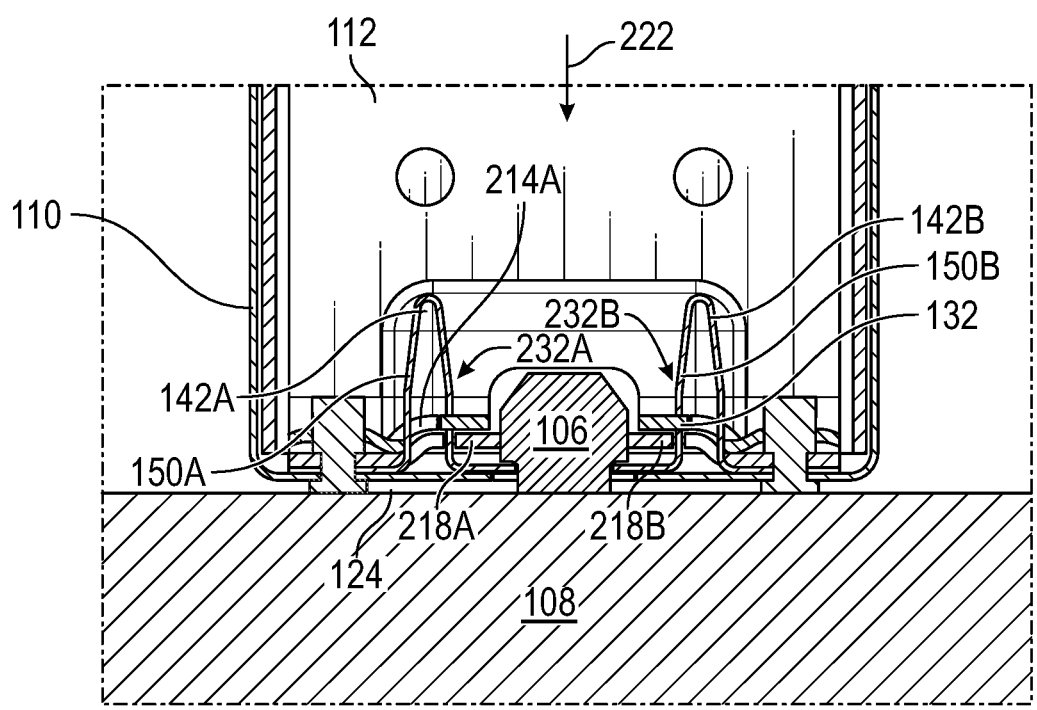

Referring to FIG. 3D, a force 222 applied to the second connection assembly 104 in the direction shown in FIG. 3C brings a portion of the spring flanges 142 through respective apertures 214. As this occurs, the tabs 218 begin to contact and slide along the second spring members 150 of the spring flanges 142. Ultimately, as the body 210 of the second connection assembly 104 is brought closer to the base 132, the tabs 218 shift towards a locking arrangement 230 defined along the spring flanges 142. In general, the locking arrangement 230 includes some predefined structure that lock the tabs 218 along the spring flanges 142, thereby locking the second connection assembly 104 in place relative to the first connection assembly 102. For example, the locking arrangement 230 includes any grooves, slots, openings, edges, and the like that engage with the tabs 218. In the specific example shown, the locking arrangement 230 includes a pair of slots 232 extending through a portion of the second spring member 150 of each spring flange 142. Moving from FIG. 3D to FIG. 3E, the slots 232 receive the tabs 218 to lock the body 210 against the base 132. In some examples, the spring flanges 142 deflect as the tabs 218 navigate down along the spring members 150 of the spring flanges 142. FIGS. 3F-3H provide additional views of the different stages of the subject connection mechanism.

Figure 4A:
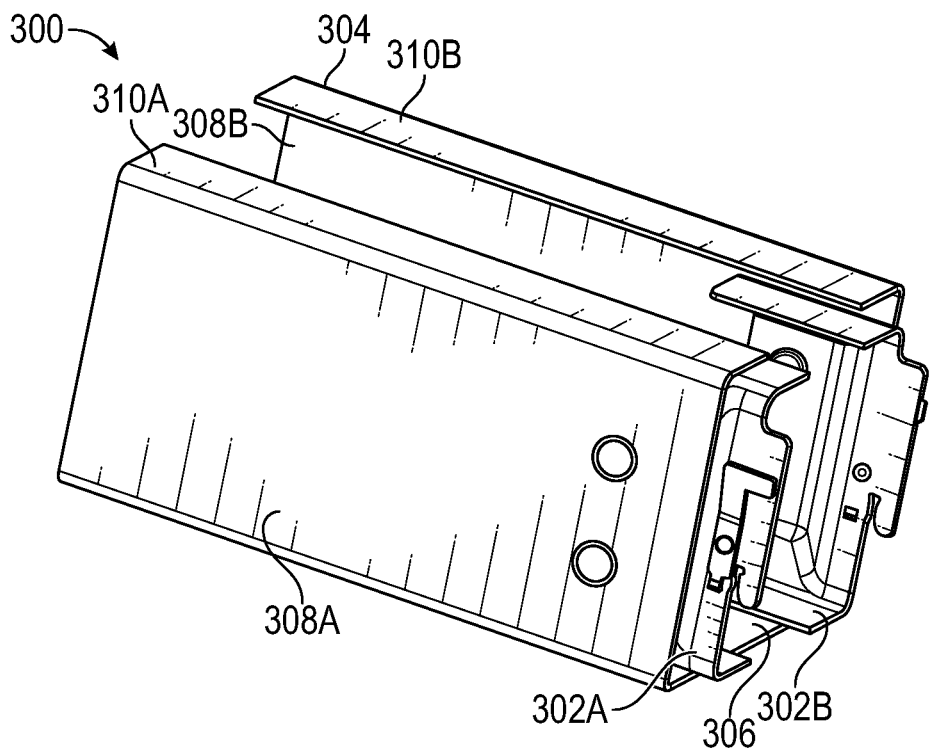
FIG. 4A is an oblique view of a header assembly including a header and a spring clip engaged to a header.
Figure 4B:
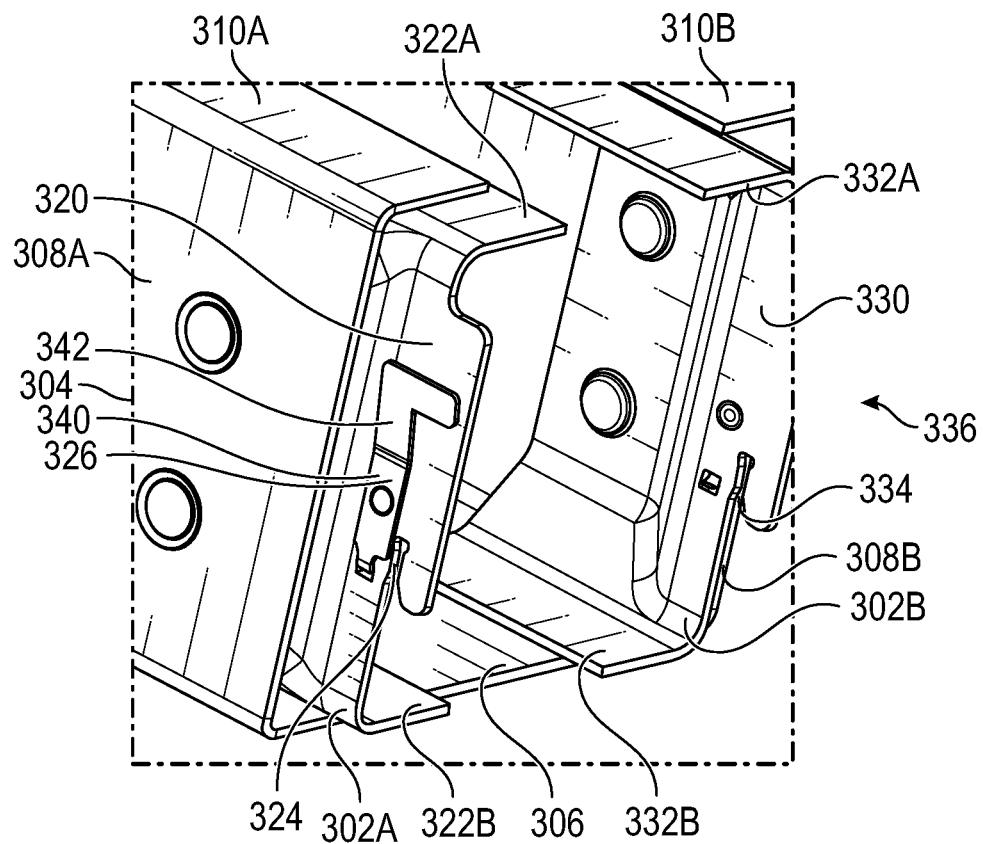
FIG. 4B is an enhanced view of the header assembly detailing the spring clip.

Referring to FIGS. 4A-4I, a header assembly and jamb assembly are illustrated, which may be engaged as described to interconnect other framing components of the framing system 100 or otherwise. Referring to FIGS. 4A-4B, a header assembly 300 as shown includes at least one header connector 302 positioned along a header segment 304. The header segment 304 includes a web 306, a pair of flanges 308 designated flange 308A and flange 308B extending orthogonally from the web 306, and a pair of stiffening lips 310 designated lip 310A and lip 310B extending orthogonally from the flange 308A and the flange 308B, respectively. As indicated, a header connector 302 is seated along each of the flanges 308, such that a portion of each header connector 302 extends or protrudes out from the end of the header segment 304.

In the present example, a pair of header connectors 302 designated header connector 302A and header connector 302B are mounted, positioned along, or formed integrally with the header segment 304 in the positions shown. The header connector 302A includes a connector web 320, and a pair of connector flanges 322 (designated connector flange 322A and connector flange 322B) defined along opposite respective ends of the connector web 320. In addition, the connector 302A includes a notch 324 defined along the connector web 320, and a spring clip 326 engaged to an outer surface of the connector web 320. The connector 302A is generally positioned along the header segment 304 such that the connector web 320 overlaps the flange 308A, the connector flange 322A overlaps the lip 310A, and the connector flange 322B overlaps a portion of the web 306. Similarly, the header connector 302B includes a connector web 330, and a pair of connector flanges 332 (designated connector flange 332A and connector flange 332B) defined along opposite respective ends of the connector web 330. In addition, the connector 302B includes a notch 334 defined along the connector web 330, and a spring clip 336 engaged to an outer surface of the connector web 330. The connector 302B is generally positioned along the header segment 304 such that the connector web 330 overlaps the flange 308B, the connector flange 332A overlaps the lip 310B, and the connector flange 332B overlaps a portion of the web 306.

As shown in FIG. 4B, the spring clip 326 of the header connector 302A includes a mounted portion 340 in communication with an engagement member 342. In some examples the mounted portion 340 extends planarly over the web 320 of the header connector 302A. The engagement member 342 extends from the mounted portion 340 of the spring clip 326 at a predetermined angle away from the web 320 and is biased to maintain this original shape configuration. The engagement member 342 may further include an L-shape as shown. While not directly visible in FIG. 4B, the spring clip 336 includes the same features as the spring clip 326, as supported by the figures and description of FIGS. 4E-4I. The spring clips 326 and 336 may be formed integrally with respective header connectors 302.

Figure 4C:
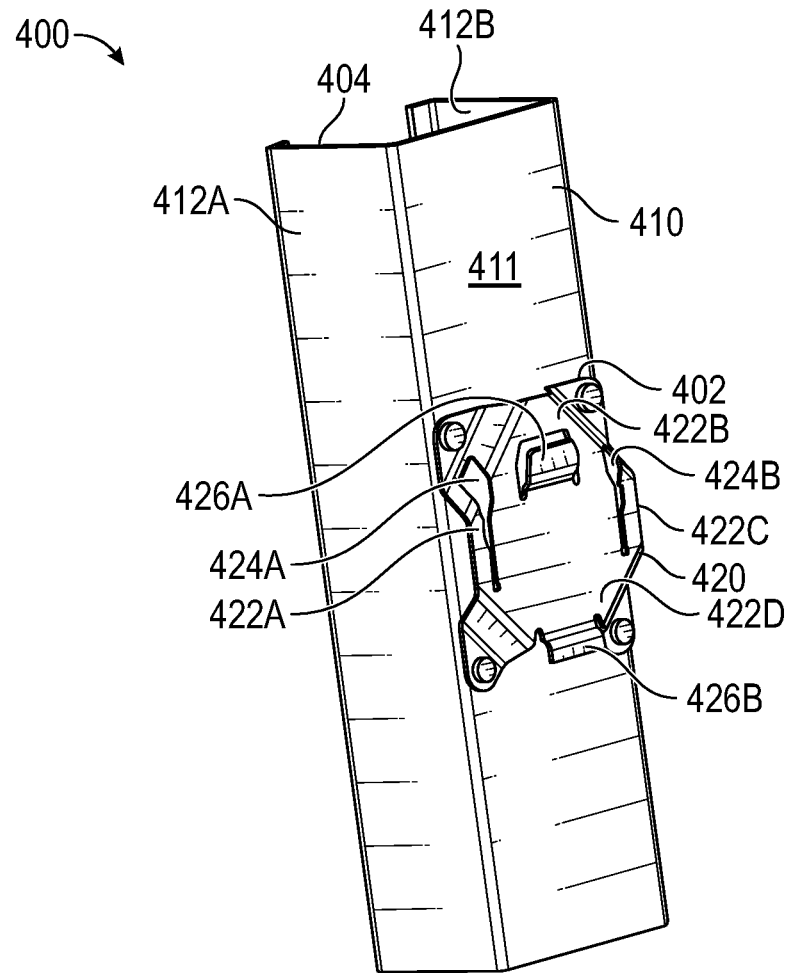
FIG. 4C is a perspective view of a jamb assembly including a jamb connector and a jamb.
Figure 4D:
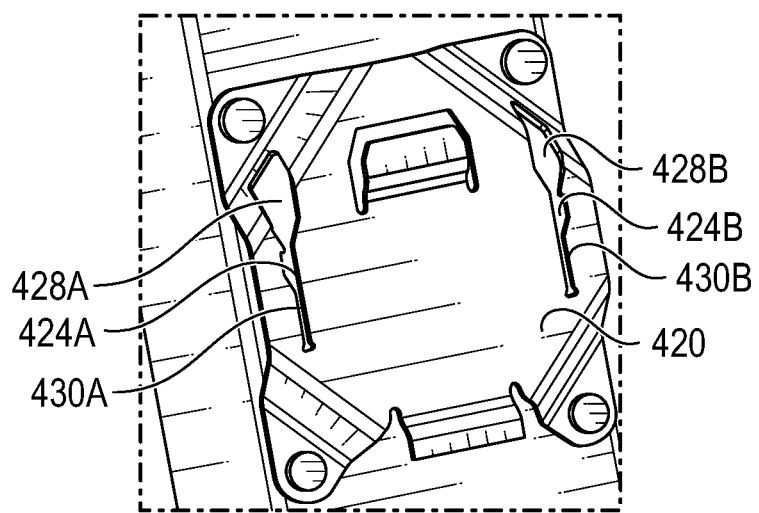
FIG. 4D is an enhanced view of the jamb connector.

Referring to FIGS. 4C-4D, a jamb stud assembly 400 as presented includes a jamb connector 402 positioned along a stud segment 404. Similar to the header connectors 302, the jamb connector 402 may be mounted along the stud segment 404 in the position shown or formed integrally with the stud segment 404 during manufacturing. In either case, the jamb connector 402 is positioned along a back surface 411 of a web 410 of the stud segment 404 as shown; with the stud segment further defining at least a pair of stud flanges 412 (designated stud flange 412A and stud flange 412B) defined along opposite ends of the web 410. In general, the jamb connector 402 is configured to engage with the header connector 302 to interconnect the stud segment 404 with the header segment 304, as further described herein.

In some examples, the jamb connector 402 includes a body 420 defining a first side 422A, a second side 422B, a third side 422C, and a fourth side 422D. The jamb connector 402 includes slots 424 defined through the body 420, including a first slot 424A defined along the first side 422A, and a second slot 424B defined along the third side 422C. In some examples, the jamb connector 402 further includes a first tab 426A formed along the second side 422B, and a second tab 426B formed along the fourth side 422D. The slots 424 and tabs 426 accommodate engagement with the header assembly 300 as further described herein. The tabs 426 facilitate extra strength capacity in particular loading conductions. In some examples, as indicated in FIG. 4D, the slots 424 define a receiving portion 428 and a locking portion 430, with the receiving portion 428 being larger than the locking portion 430 to facilitate the engagement with the header assembly 300.

Figure 4E:
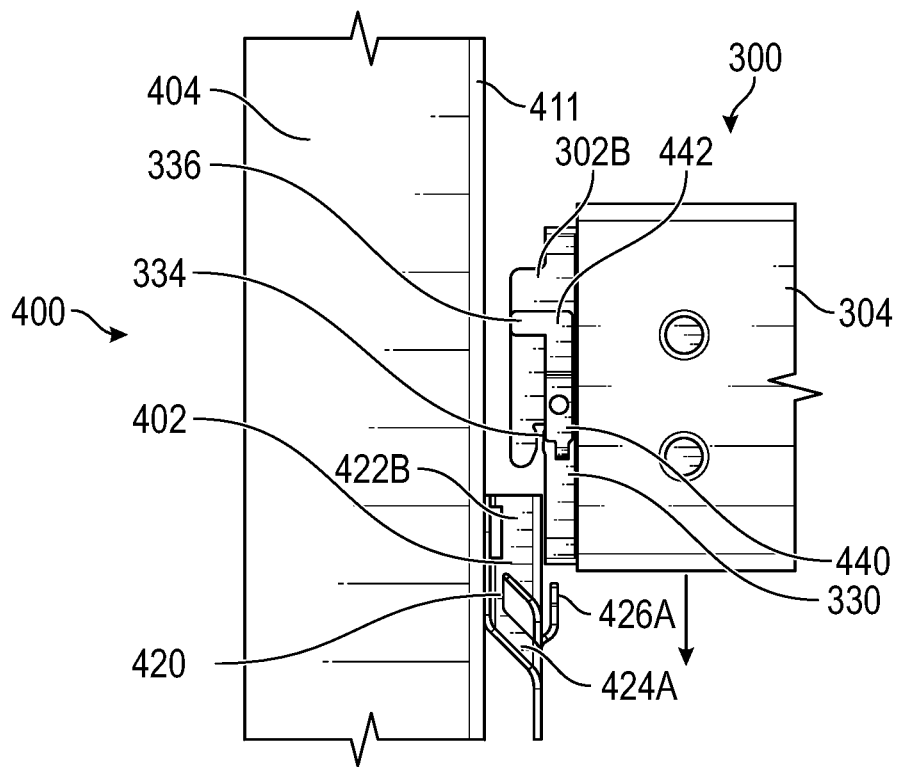
FIG. 4E is a side view illustrating a first stage for engaging the header connector to the jamb connector with the header aligned with the jamb and ready to be lowered vertically into position.

Referring to FIGS. 4E-4I, various stages for an exemplary engagement of the header assembly 300 with the jamb assembly 400 are illustrated. In FIG. 4E, the jamb assembly 400 is positioned to initiate engagement with the header assembly 300 such that the jamb assembly 400 is in vertical alignment in the example, and the header segment 304 extends horizontally across the surface 411 of the stud segment 404 of the jamb assembly 400. In particular, the jamb assembly 400 is positioned along the header assembly 300 as shown such that the spring clip 336 of the connector 302B is aligned over the first side 422A of the body 420 of the jamb connector 402. The spring clip 336 is further aligned over the slot 424A. Similarly, although not visible in the subject figures, the spring clip 326 is aligned over the slot 424B. Like the spring clip 326, the spring clip 336 includes a mounted portion 440 in communication with an engagement member 442 as shown. In some examples the mounted portion 440 extends planarly over the web 330 of the header connector 302B. The engagement member 442 extends from the mounted portion 440 of the spring clip 336 at a predetermined angle away from the web 330 and is biased to maintain this original shape configuration.

Figure 4F:
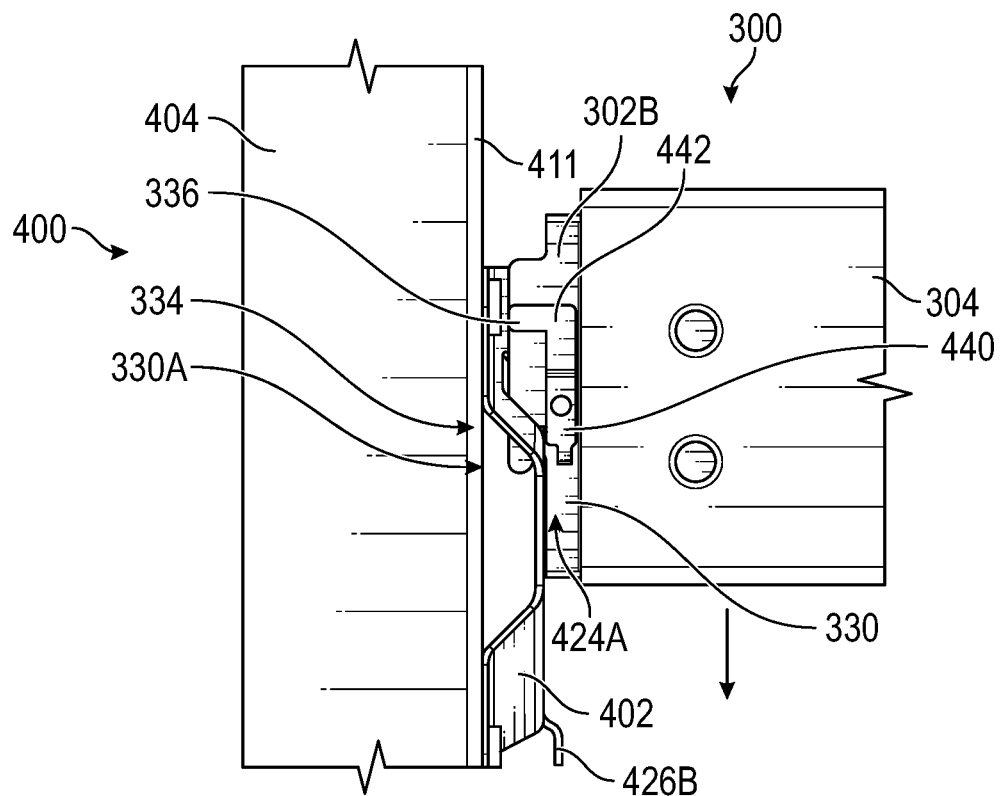
FIG. 4F is a side view illustrating another stage for engaging the header connector to the jamb connector with the header being further lowered along the jamb.
Figure 4G:
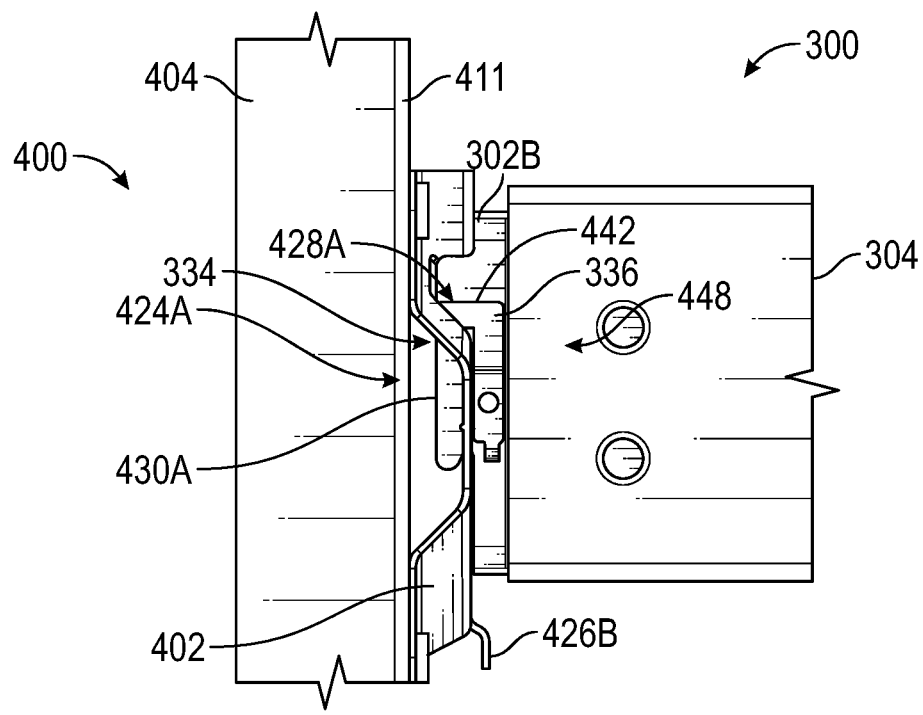
FIG. 4G is a side view illustrating another stage for engaging the header connector to the jamb connector with the header lowered to a position where the spring clip of the header connector begins to temporarily deflect.

Referring to FIGS. 4F-4G, the header assembly 300 is lowered onto the jamb assembly 400 in the manner shown, urging the mounted portion 440 of the spring clip 336 towards the tab 426B of the jamb connector 402. As indicated, a portion of the web 330 of the connector 302B is received within the slot 424A, such that the notch 334 engages with the locking portion 430A of the slot 424A, and the engagement member 442 of the spring clip 336 slides along structure (448) of the jamb connector 402 defining the slot 424A. The engagement member 442 of the spring clip 336 is configured to deflect temporarily as it traverses and slides along the structure 448 of the jamb connector 402 defining the slot 424A.

Figure 4H:
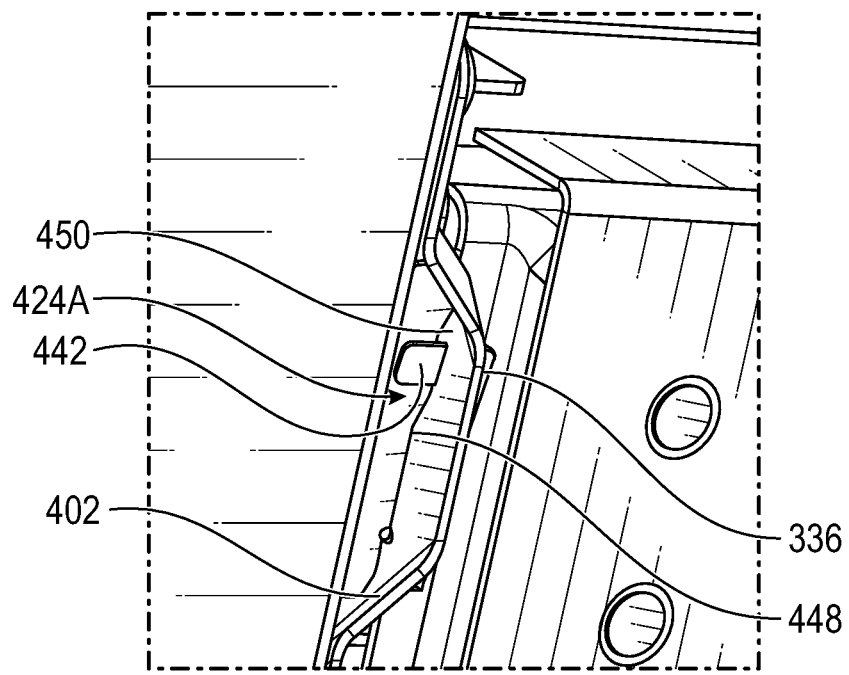
FIG. 4H is an enhanced view illustrating the header connector engaged to the jamb connector.
Figure 4I:
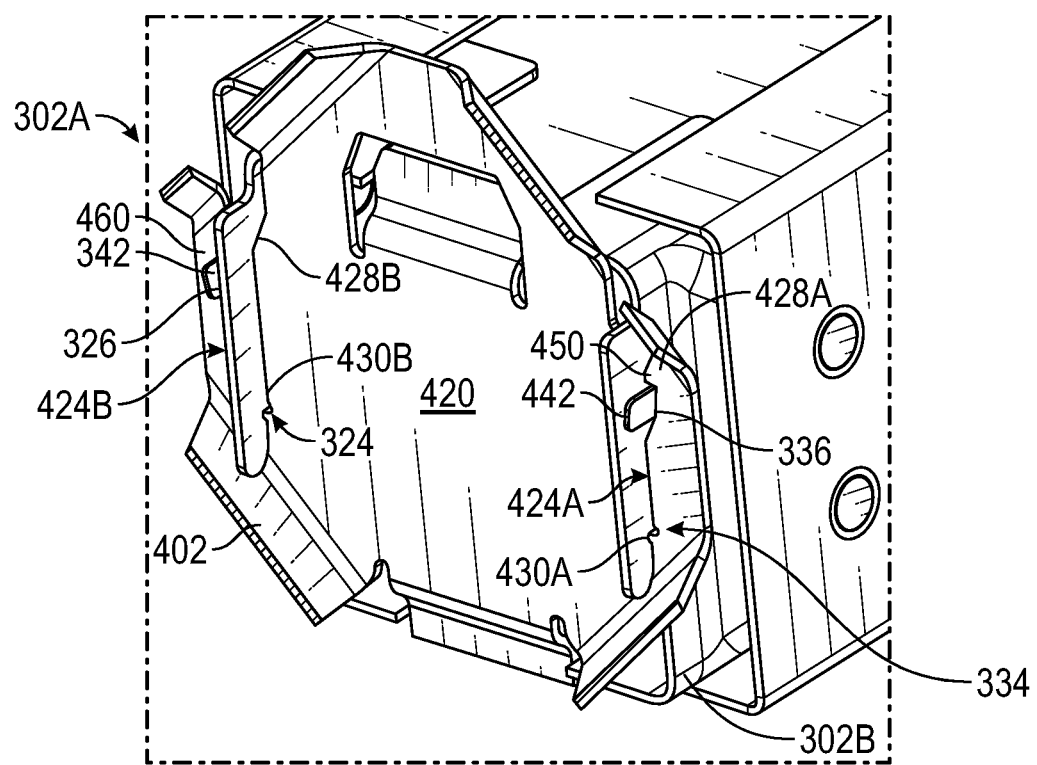
FIG. 4I is another enhanced view illustrating the spring clip engaged within a face of the jamb connector.

Referring to FIGS. 4H-4I, the header assembly 300 is lowered onto the jamb assembly 400 as previously described until the components assume the locked configuration shown. Moving from the previous engagement stages of FIGS. 4F-4G, the engagement member 442 of the spring clip 336 returns (snaps back) to its unrestrained original configuration, and locks underneath an edge 450 of the jamb connector 402 forming a portion of the slot 424A, restricting movement of the header connector 302 from the jamb connector 402. FIG. 4I indicates that the engagement member 342 similarly locks underneath an edge portion 460 defined by the body 420 of the jamb connector 402. Accordingly, the header segment 304 is now locked into a fixed position relative to the jamb stud segment 404.

Illustrative aspects of this disclosure include:

Statement 1. A framing system includes a first connection assembly comprising a first connector positioned along a track. The first connection assembly is configured to connect with a fastener mounted along a substrate to interconnect the track with the substrate. The first connector includes a base and a spring clasp defined along the base. The spring clasp includes a first spring flange defining at least one spring member and a first retention edge, and a second spring flange defining at least one spring member and a second retention edge. The first connection assembly is configured such that the fastener engages the first and second retention edges and deflects the first and second spring flanges temporarily away from an original configuration, the first and second spring flanges biased to return to the original configuration to lock the first and second retention edges along the fastener.

Statement 2. The framing system of statement 1, wherein the base defines a first section, a second section, and a center section between the first section and the second section, the base further defining an opening extending through the center section that receives a portion of the fastener.

Statement 3. The framing system of statement 1, wherein to lock the first and second retention edges along the fastener the first and second retention edges are positioned along a groove of the fastener and abut a bottom edge of the fastener, restricting movement of the first connector from the fastener.

Statement 4. The framing system of statement 1, wherein the first spring flange further defines a tail member seated along a bottom side of the base, and wherein the at least one spring member of the first spring flange includes a first plurality of spring members defining a first spring member extending vertically from the tail member and a second spring member in communication with the first spring member along an apex, the first spring flange configured to deflect as the first retention edge contacts the fastener such that the first spring member is temporarily brought closer to the second spring member.

Statement 5. The framing system of statement 4, wherein the first retention edge is defined at a terminal end of the first spring flange along a third spring member in communication with the second spring member of the first plurality of spring members.

Statement 6. The framing system of Statement 1, wherein the first retention edge is oriented towards the second retention edge and at least a portion of the first retention edge underlaps and is visible through an opening formed through the base.

Statement 7. The framing system of Statement 1, wherein the first connection assembly is seated along a web of the track, and the fastener is mounted to the substrate, such that the first connection assembly interconnects the substrate with the track.

Statement 8. The framing system of Statement 1, further comprising: a second connection assembly that engages with the first connection assembly to interconnect framing components. The second connection assembly including a second connector positioned along a stud. The second connector including: a body defining a first portion, and a second portion along opposite lateral sides of a center portion, a first aperture defined along the first portion, and a second aperture defined along the second portion, a first spring tab defined along the first aperture, and a second spring tab defined along the second aperture, wherein the second connection assembly is configured to assume a locked configuration over the first connection assembly such that the first tab and the second tab engage a locking arrangement defined along the spring clasp thereby interconnecting the first connection assembly to the second connection assembly.

Statement 9. The framing system of Statement 8, wherein the first tab is at least partially received within a slot defined along the first spring flange, and the second tab is at least partially received within a second slot defined along the second spring flange.

Statement 10. The framing system of Statement 8, wherein the body includes a connection opening extending through the center portion, and in the locked configuration the connection opening is in vertical alignment relative to the opening of the first connection assembly.

Statement 11. The framing system of Statement 1, wherein the fastener includes a stem, a sidewall formed over the stem, and a tapered end formed over the sidewall, the first and second retention edges configured to lock about a bottom edge of the fastener defined at an intersection between the stem and the sidewall.

Statement 12. The framing system of Statement 1, wherein the first spring flange includes a plurality of ridges.

Statement 13. The framing system of Statement 12, wherein the first retention edge is defined between a first ridge of the plurality of ridges and a second ridge of the plurality of ridges.

Statement 14. The framing system of Statement 1, wherein the first connection assembly is seated along a web of the track, and the fastener is mounted to the substrate, such that the first connection assembly interconnects the substrate with the track.

Statement 15. The framing assembly of statements 1-14, further including a method formed from the framing assembly of any of the subject statements.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various examples, it should be understood that these examples are illustrative and that the scope of the disclosure is not limited to such examples. Many variations, modifications, additions, and improvements are possible. More generally, examples in accordance with the present disclosure have been described in the context of particular implementations. Functionality may be separated or combined in blocks differently in various examples of the disclosure or described with different terminology. These and other variations, modifications, additions, and improvements may fall within the scope of the disclosure as defined in the claims that follow.

What is claimed is:

1. A framing system for interconnecting framing components, comprising:
    a first connection assembly comprising a first connector, including:
        a base defining a first section, a second section, and a center section between the first section and the second section, the base further defining an opening extending through the center section, and
        a spring clasp defined along the base, including
            a first spring flange defining at least one first spring member and a first retention edge, and
            a second spring flange defining at least one second spring member and a second retention edge,
    a second connection assembly that engages with the first connection assembly to interconnect the framing components, the second connection assembly comprising a second connector including:
        a body defining a first portion, and a second portion along opposite lateral sides of a center portion, a first aperture defined along the first portion, and a second aperture defined along the second portion,
        a first spring tab defined along the first aperture, and
        a second spring tab defined along the second aperture;
    wherein in a first locked configuration, the first connection assembly receives a fastener through the opening, the fastener engages the first and second retention edges and deflects the first and second spring flanges temporarily away from an original configuration, the first and second spring flanges biased to return to the original configuration to lock the first and second retention edges along the fastener,
    wherein in a second locked configuration, the second connection assembly is positioned over the first connection assembly such that the first tab and the second tab engage a locking arrangement defined along the spring clasp thereby interconnecting the first connection assembly to the second connection assembly.

2. The framing system of claim 1, wherein the first retention edge is oriented towards the second retention edge and at least a portion of the first retention edge underlaps and is visible through the opening of the base.

3. The framing system of claim 1, wherein the first connection assembly is seated along a web of a track, the track including a track opening in vertical alignment with the opening of the base to receive the fastener at least partially through the web of the track.

4. The framing system of claim 1, wherein the first tab is at least partially received within a slot defined along the first spring flange, and the second tab is at least partially received within a second slot defined along the second spring flange.

5. The framing system of claim 1, wherein the body includes a connection opening extending through the center portion, and in the locked configuration the connection opening is in vertical alignment relative to the opening of the first connection assembly.

6. The framing system of claim 1, wherein the first tab and the second tab are both oriented away from the center portion of the body.

7. The framing system of claim 1, wherein the fastener engages the first and second retention edges and deflects the first and second spring flanges.

8. The framing system of claim 1:
wherein the first spring flange further defines a tail member seated along a bottom side of the base, and
wherein the first spring flange includes a first plurality of spring member that includes a first spring member extending vertically from the tail member and a second spring member in communication with the first spring member along an apex, the first spring flange configured to deflect as the first retention edge contacts the fastener such that the first spring member is temporarily brought closer to the second spring member.

9. The framing system of claim 8, wherein the first retention edge is defined at a terminal end of the first spring flange along a third spring member in communication with the second spring member of the first plurality of spring members.

10. The framing system of claim 1, wherein the second connection assembly is seated along a web of a stud, the second connection assembly further positioned at a terminal end of the stud.

11. The framing system of claim 10, wherein the second connection assembly is configured to engage with the first connection assembly to interconnect the stud with the track such that the stud is in orthogonal alignment relative to the track.

12. The framing system of claim 1, wherein the fastener includes a stem, a sidewall formed over the stem, and a tapered end formed over the sidewall.

13. The framing system of claim 12, wherein the bottom edge of the fastener is defined at an intersection between the stem and the sidewall.

14. The framing system of claim 1, wherein the first spring flange include a plurality of ridges defined adjacent the first retention ridge.

15. The framing system of claim 14, wherein the first retention edge is defined between a first ridge of the plurality of ridges and a second ridge of the plurality of ridges.

16. The framing system of claim 14, wherein a portion of each of the plurality of ridges abuts the base along a center section, restricting upward movement of the first retention edge and facilitating a lateral movement of the first retention ridge as the first spring flange is deflected.

17. A method of making the framing system of claim 1, comprising:
forming a first connection assembly comprising a first connector, including:
providing a base, and
forming a spring clasp along the base, including
forming a first spring flange defining a first retention edge, and
forming a second spring flange defining a second retention edge,
wherein the first and second retention edges are configured to temporarily shift laterally from an original configuration and then return to the original configuration to lock the first and second retention edges along a fastener;
forming a second connection assembly including a second connector that engages with the first connection assembly to interconnect framing components including:
forming a body defining a first portion, and a second portion along opposite lateral sides of a center portion, a first aperture defined along the first portion, and a second aperture defined along the second portion,
forming a first spring tab along the first aperture, and forming a second spring tab along the second aperture,
wherein the second connection assembly is configured to assume a locked configuration over the first connection assembly such that the first tab and the second tab engage a locking arrangement defined along the spring clasp thereby interconnecting the first connection assembly to the second connection assembly.

* * * * *